United States Patent
Noda

(10) Patent No.: US 6,642,922 B1
(45) Date of Patent: Nov. 4, 2003

(54) INTERFACE APPARATUS FOR DYNAMIC POSITIONING AND ORIENTATION OF A ROBOT THROUGH REAL-TIME PARAMETER MODIFICATIONS

(75) Inventor: Akira Noda, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/252,830

(22) Filed: Feb. 19, 1999

(30) Foreign Application Priority Data

Feb. 25, 1998 (JP) .......................................... 10-043837

(51) Int. Cl.[7] .......................... G06F 15/00; G06F 19/00; G09G 5/00; G06K 9/00
(52) U.S. Cl. ...................... 345/419; 345/581; 700/245; 700/264; 382/153; 382/154
(58) Field of Search ................................. 345/473–475, 345/419; 700/245–264; 606/130; 318/566, 568.1; 434/262; 378/42

(56) References Cited

U.S. PATENT DOCUMENTS

| | | | | |
|---|---|---|---|---|
| 3,892,051 A | * | 7/1975 | Bunker | 434/43 |
| 4,831,548 A | * | 5/1989 | Matoba et al. | 700/264 |
| 4,987,527 A | * | 1/1991 | Hamada et al. | 700/64 |
| 5,046,022 A | * | 9/1991 | Conway et al. | 700/250 |
| 5,253,189 A | * | 10/1993 | Kramer | 703/7 |
| 5,488,689 A | * | 1/1996 | Yamato et al. | 700/263 |
| 5,495,410 A | * | 2/1996 | Graf | 700/86 |
| 5,581,666 A | * | 12/1996 | Anderson | 700/263 |
| 5,771,310 A | * | 6/1998 | Vannah | 38/154 |
| 6,023,276 A | * | 2/2000 | Kawai et al. | 345/419 |
| 6,104,412 A | * | 8/2000 | Tsutsuguchi et al. | 345/473 |
| 6,226,567 B1 | * | 5/2001 | Kaneko et al. | 700/264 |
| 6,556,206 B1 | * | 4/2003 | Benson et al. | 345/573 |

OTHER PUBLICATIONS

Kensuke Hasegawa et al., Principles of Robotics—Modelling, Control and Sensing–, Nov. 10, 1995, pp. 52–56.

* cited by examiner

Primary Examiner—Matthew C. Bella
Assistant Examiner—Anthony Blackman
(74) Attorney, Agent, or Firm—Staas & Halsey LLP

(57) ABSTRACT

A display plane shown in the computer graphics for displaying an arbitrary plane in a three-dimensional space is mapped to a movable range of an end effector of a robot. The movable range is limited to a displayed two-dimensional plane. A user moves and positions the end effector on the display plane.

26 Claims, 23 Drawing Sheets

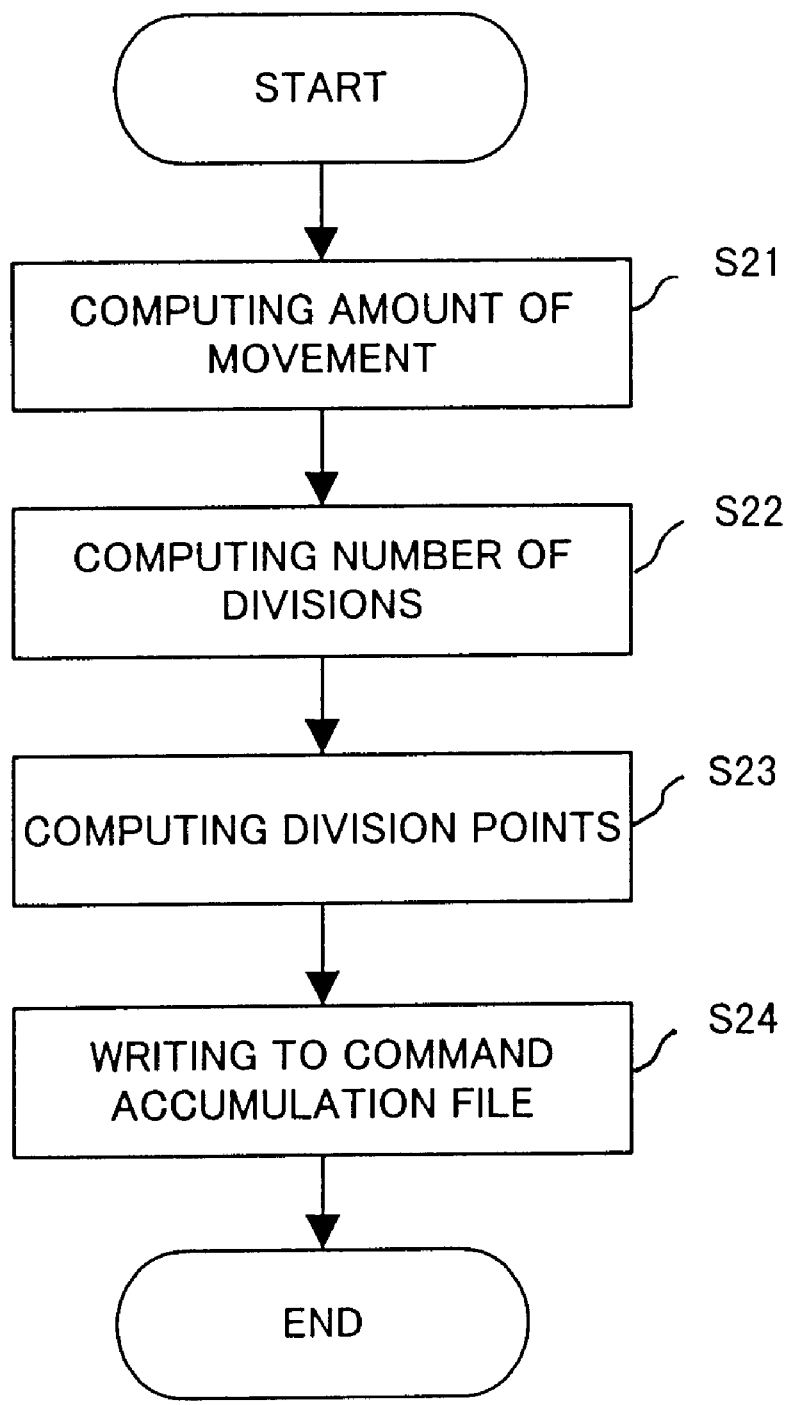
F I G. 2 2

INTERFACE APPARATUS FOR DYNAMIC POSITIONING AND ORIENTATION OF A ROBOT THROUGH REAL-TIME PARAMETER MODIFICATIONS

BACKGROUND OF THE INVENTION

1. Field of the Invention

The present invention relates to an apparatus for providing the interface in performing operations required in each step of designing, developing, and controlling a robot.

2. Description of the Related Art

Recently, various robots for performing operations for people such as an industrial robot, an experiment/laboratory robot, etc. have been developed for practical use in various fields. Among these robots, an arm-type robot having a manipulator (robot arm) has the feature that it can perform manual operations.

An end effector is provided at the tip of the manipulator. It directly works on a work object, holds it, or moves it. A typical end effector is a gripper (robot hand) for holding an object.

A computer system for performing a robot simulation has the function of designing a robot, performing a simulation operation, visualizing an operation result, etc. The simulation object includes kinematics, dynamics, control, etc. References to the robot simulation can be 'Basic Robot Engineering Control' (by Kensuke Hasegawa and Ryosuke Masuda, published by Shokodo), 'Robotics' (by Shigeki Tohyama, published by Daily Industry News Press), etc.

The dynamics simulation of an arm-type robot can be performed mainly in two methods, that is, a kinematics simulation method and an inverse kinematics simulation method. In the kinematics simulation method, the amount of rotation of the joint angle of a manipulator is input as input data, and the data of the position and orientation of an end effector is output. On the other hand, in the inverse kinematics simulation method, the position and orientation of the end effector are input, and the amount of rotation of the joint angle is output.

The position and orientation of an end effector, and the rotation angle of a joint angle are designed as coupled coordinate systems in a three-dimensional space. Each of the parameters of the position, orientation, and rotation angle is represented as a relative parameter in the coupled coordinate systems. A simulation result obtained from these input data is normally visualized in three-dimensional computer graphics (three-dimensional CG) for a visual check.

However, there is the following problem with the conventional technology.

When a robot is to be positioned in a simulation, it is necessary to input as input data the amount of rotation of a joint angle, or the position and orientation of an end effector. To determine the input data, the rotation angle and moving distance at each coordinate system should be set. However, it is difficult for an operator to predict the rotation and movement in the three-dimensional space.

To easily predict the operations, a coordinate system representing the position and orientation of the end effector is generally defined, and a line parallel to the coordinate axis of the coordinate system, or a plane parallel to the plane containing two coordinate axes can be set. The line or the plane is assumed to be a movable range of the end effector, and the positioning in. a three-dimensional space can be simplified into the problem in the one- or two-dimensional space.

In the above described positioning method, it is relatively easy to predict the movement of the end effector on the predetermined line parallel to the coordinate axis of the coordinate system, or on the predetermined plane parallel to the plane containing two coordinate axes. However, for other movements, it is necessary to input all parameters for the position and orientation after setting them in the three-dimensional space.

Therefore, in this method, it is difficult to predict the position based on the data other than the predetermined coordinate system, and a plurality of applicable coordinate systems should be preliminarily set. However, to perform an arbitrary positioning process in a three-dimensional space, it is necessary but impossible to set a number of coordinate systems with rotations of the coordinate system taken into account.

Since the display window is represented in a two-dimensional plane although a simulation result is represented in the three-dimensional CG on the screen, there is the problem that it is not suitable for displaying a positioning result in the three-dimensional space.

SUMMARY OF THE INVENTION

The present invention aims at providing an interface apparatus capable of predicting a movement of a robot when the robot is arbitrarily positioned in the three-dimensional space, thereby improving the efficiency of the operations.

According to the first aspect of the present invention, the interface apparatus includes a plane designation unit and a display unit. The plane designation unit designates an arbitrary plane in a three-dimensional space. The display unit displays the image of a robot on the designated plane in the graphics representation.

When a specific portion of a robot is operated, the plane designation unit specifies a plane containing the current position and the target position of the portion, and the display unit displays the plane.

According to the second aspect of the present invention, the interface apparatus includes a mapping unit, a display unit, a plane designation unit, and a change unit. The mapping unit associates a plane in a three-dimensional space with a display plane. The display unit displays an image of the robot on the plane in the three-dimensional space on the display plane in the graphics representation. The plane designation unit designates a parameter indicating the position and orientation of the plane in the three-dimensional space. The change units changes the position and orientation of the plane by changing the parameter.

BRIEF DESCRIPTION OF THE DRAWINGS

FIG. 22 is a flowchart of generating a path.

DESCRIPTION OF THE PREFERRED EMBODIMENTS

The embodiments of the present invention are described below in detail by referring to the attached drawings.

Figure 1:
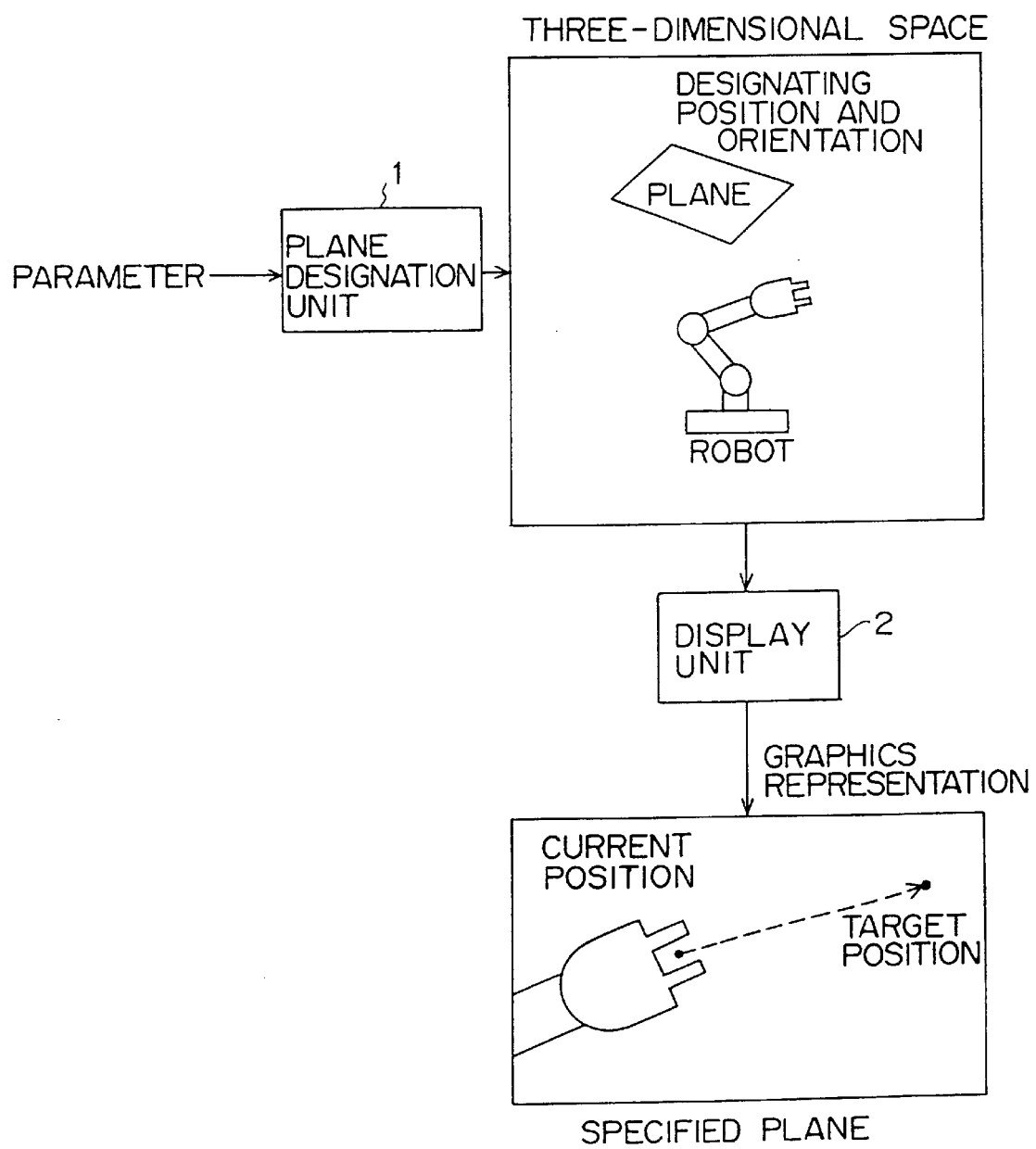
FIG. 1 shows the principle of the interface apparatus according to the present invention.

FIG. 1 shows the interface apparatus according to the present invention. The interface apparatus shown in FIG. 1 comprises a plane designation unit 1 and a display unit 2. The plane designation unit 1 designates an arbitrary plane in a three-dimensional space. The display unit 2 displays the image of a robot on the designated plane in the graphics representation.

For example, in designating the two-dimensional plane, a sphere is assumed with a central point of the movable range of the end effector set as the center of the sphere. An arbitrary plane tangent to the sphere is defined as a display plane of the display window. The operator can dynamically change the display plane only by changing the position of the contact point on the sphere, and the radius of the sphere. Thus, the display plane can be set in a plane containing the current position of the end effector.

Since the CG image displayed by the display unit 2 dynamically changes with a change in setting a plane by the plane designation unit 1, the operator can freely select an arbitrary two-dimensional plane for display.

When the position of the end effector of a robot is determined, the target position can be easily designated on the displayed screen only by displaying the plane containing the current position and the target position. At this time, since it is assumed that the end effector moves on the displayed plane from the current position to the target position, the operator can easily and visually predict the operation of the robot.

The interface apparatus shown in FIG. 1 is used not only to position the end effector but also to operate other specific portions of the robot. In this case, the operations of the robot can be easily predicted by displaying the plane containing the current position and the target position of the specific portion of the robot.

For example, the plane designation unit 1 shown in FIG. 1 corresponds to a CPU (central processing unit) 21, memory 22, and an input device 23 described later and shown in FIG. 3. The display unit 2 shown in FIG. 1 corresponds to the CPU 21, the memory 22, and an output device 24 shown in FIG. 3.

According to the present embodiment, the following conditions are set to easily position a robot in a robot simulation.

(1) The coordinate system of the end effector is not fixed, but variable as necessary.

(2) The end effector is positioned in an arbitrary two-dimensional plane.

To satisfy the conditions, a display window of three-dimensional CG displaying an arbitrary plane in a three-dimensional space in which the robot exists is used. The movable range of the end effector is limited to a two-dimensional plane.

For example, in designating the two-dimensional plane, a sphere is assumed with a central point of the movable range of the end effector set as the center of the sphere. An arbitrary plane tangent to the sphere is defined as a display plane of the display window. The operator can dynamically changes the display plane only by changing the position of the contact point on the sphere, and the radius of the sphere. Thus, the display plane can be set in a plane containing the current position of the end effector.

At this time, the display plane on the screen and the two-dimensional plane which is a movable range of the end effector are mapped.

Then, the operator designates a point on the plane displayed in the display window to determine the position and orientation of the end effector to be positioned. At this time, the designated point refers to the target position of the end effector, and the orientation of the end effector is determined based on the position of the contact point on the sphere, and the direction of the normal vector of the tangent plane at the contact point.

Thus, using the tangent plane of a virtual sphere, an arbitrary two-dimensional plane can be set as necessary without preliminarily setting a number of coordinate systems of an end effector. In addition, the end effector can be easily positioned by predicting the operations of the end effector by mapping the tangent plane of the sphere on the display plane of the screen, and by limiting the movable range of the end effector to the display plane.

Figure 2:
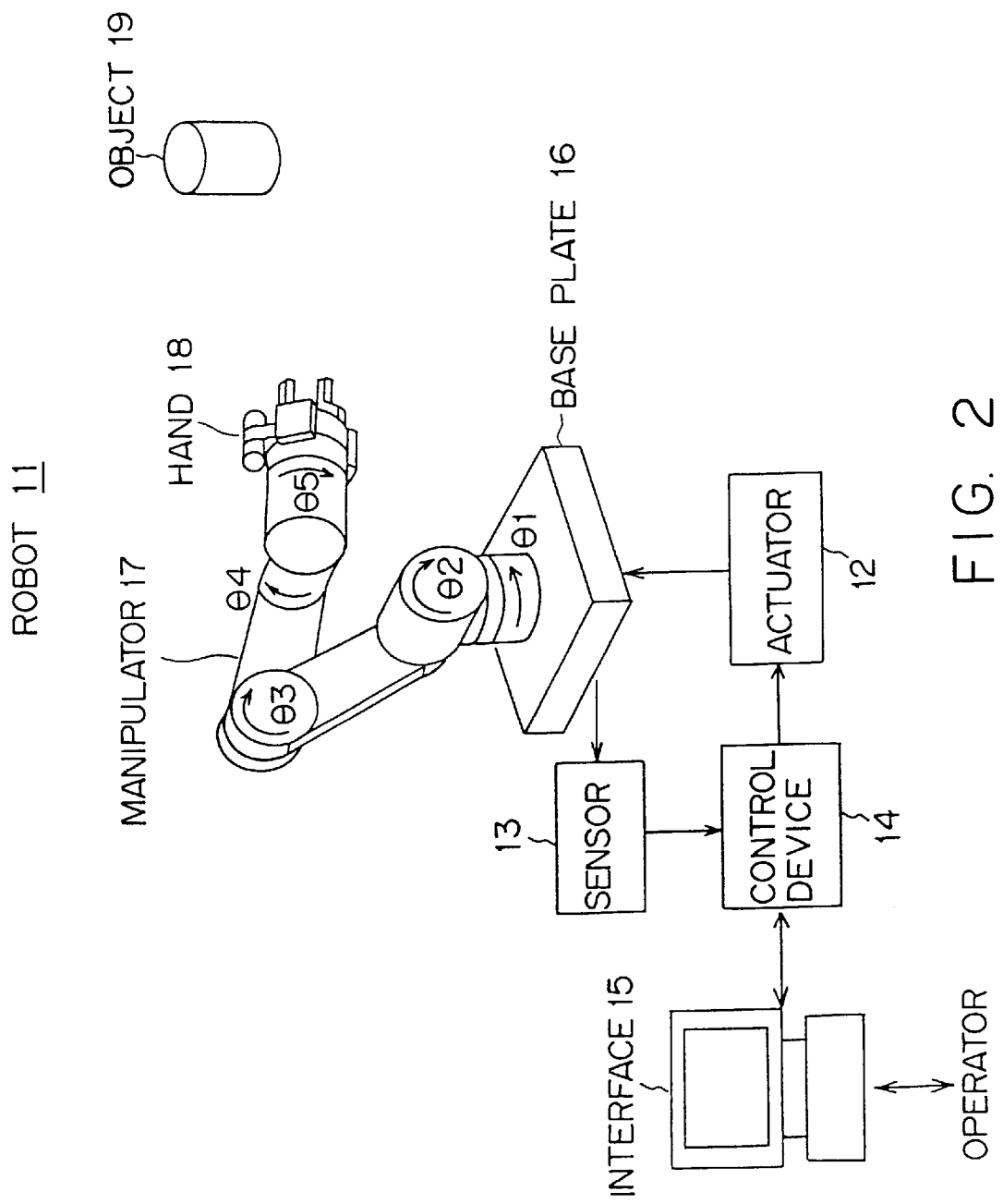
FIG. 2 shows the configuration of a robot system.

FIG. 2 shows an example of the robot system to be processed in the simulation. The system shown in FIG. 2 contains a robot 11, an actuator 12, a sensor 13, a control device 14, and an interface 15. It is operated according to the operational input from the operator. The robot 11 is provided with a manipulator 17 mounted onto a base plate 16. A hand 18, which is an end effector for holding an object 19, is attached at the tip of the manipulator 17.

The actuator 12 drives the robot 11 according to the control signal from the control device 14. The sensor 13 detects the position, speed, torque, etc. of each joint of the manipulator 17, and outputs signals corresponding to the values to the control device 14. The control device 14 contains a processing device for executing a program, and generates a control signal to be issued to the actuator 12 according to the information from the sensor 13. The interface 15 is an input/output device for functioning as an interface for exchanging information between the operator and the control device 14.

Figure 3:
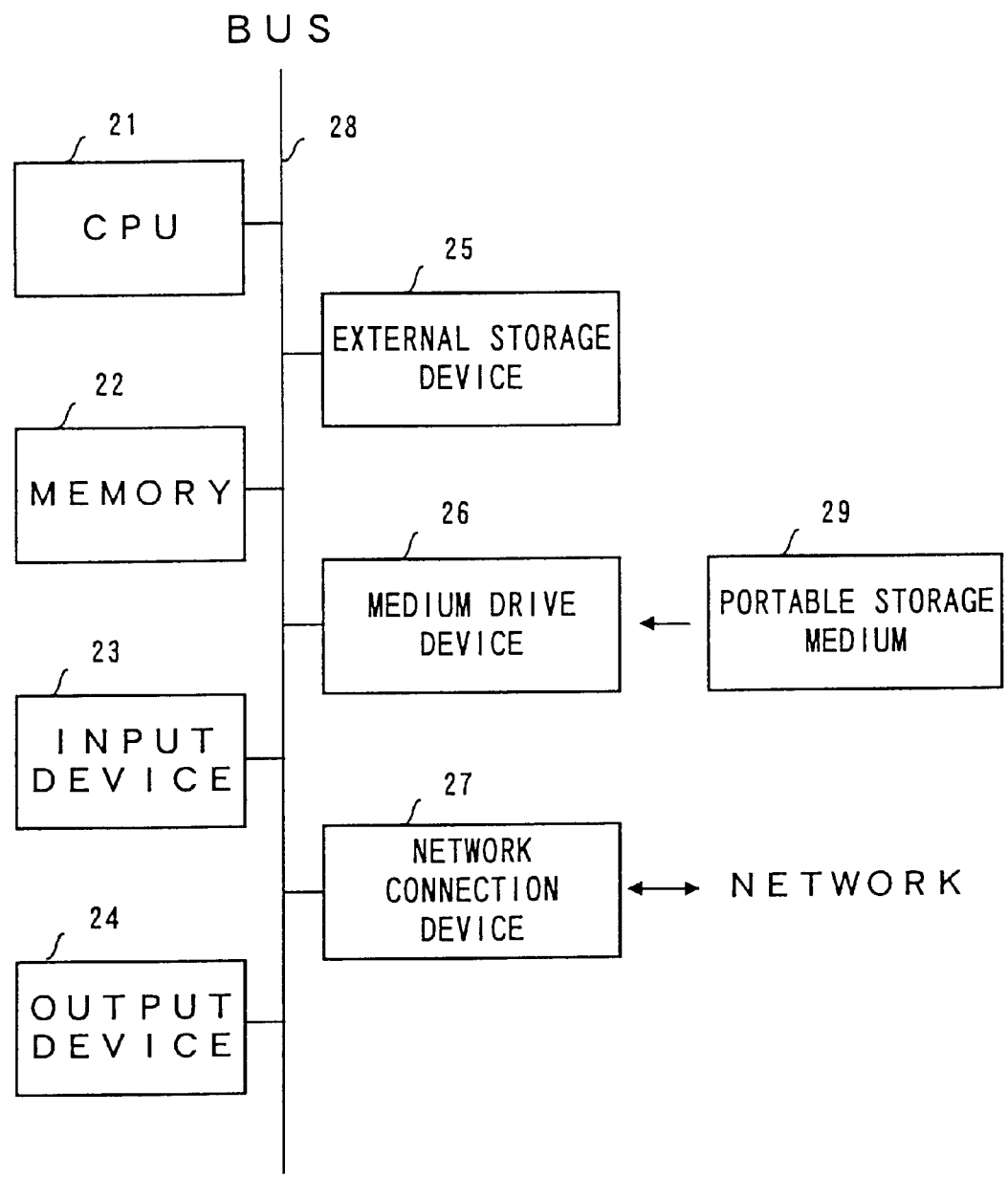
FIG. 3 shows the configuration of an information processing device.

The control device 14 and the interface 15 shown in FIG. 2 can be designed using an information processing device (computer) as shown in FIG. 3. The information processing device shown in FIG. 3 comprises the CPU 21, the memory 22, the input device 23, the output device 24, an external storage device 25, a medium drive device 26, and a network connection device 27. These units are interconnected through a bus 28.

The memory 22 includes, for example, ROM (read only memory), RAM (random access memory), etc. and stores a program and data to be used in a robot system control process.

The input device 23 is, for example, a keyboard, a pointing device, a touch panel, a joy stick, etc. to be used in inputting an instruction and information from an operator. The output device 24 is, for example, a display, a printer, etc., to be used in outputting an inquiry, a process result, etc. to the operator.

The external storage device 25 is, for example, a magnetic disk device, an optical disk device, a magneto-optical disk device, etc. The external storage device 25 can store the above described program and data, which are used as necessary after being loaded onto the memory 22. In addition, the external storage device 25 can be used as a database.

The medium drive device 26 drives a portable storage medium 29, and accesses the contents stored on the portable storage medium 29. The portable storage medium 29 can be an arbitrary computer-readable storage medium such as a memory card, a floppy disk, CD-ROM (compact disk read only memory), an optical disk, a magneto-optical disk, etc. The portable storage medium 29 can store the above described program and data, which are used as necessary after being loaded onto the memory 22.

The network connection device 27 can communicate with an external device through a network (line) such as a LAN (local area network), etc. to convert data for communications. Furthermore, the network connection device 27 can receive as necessary the above described program and data from an external unit, and the information processing device uses them after loading them to the memory 22.

Figure 4:
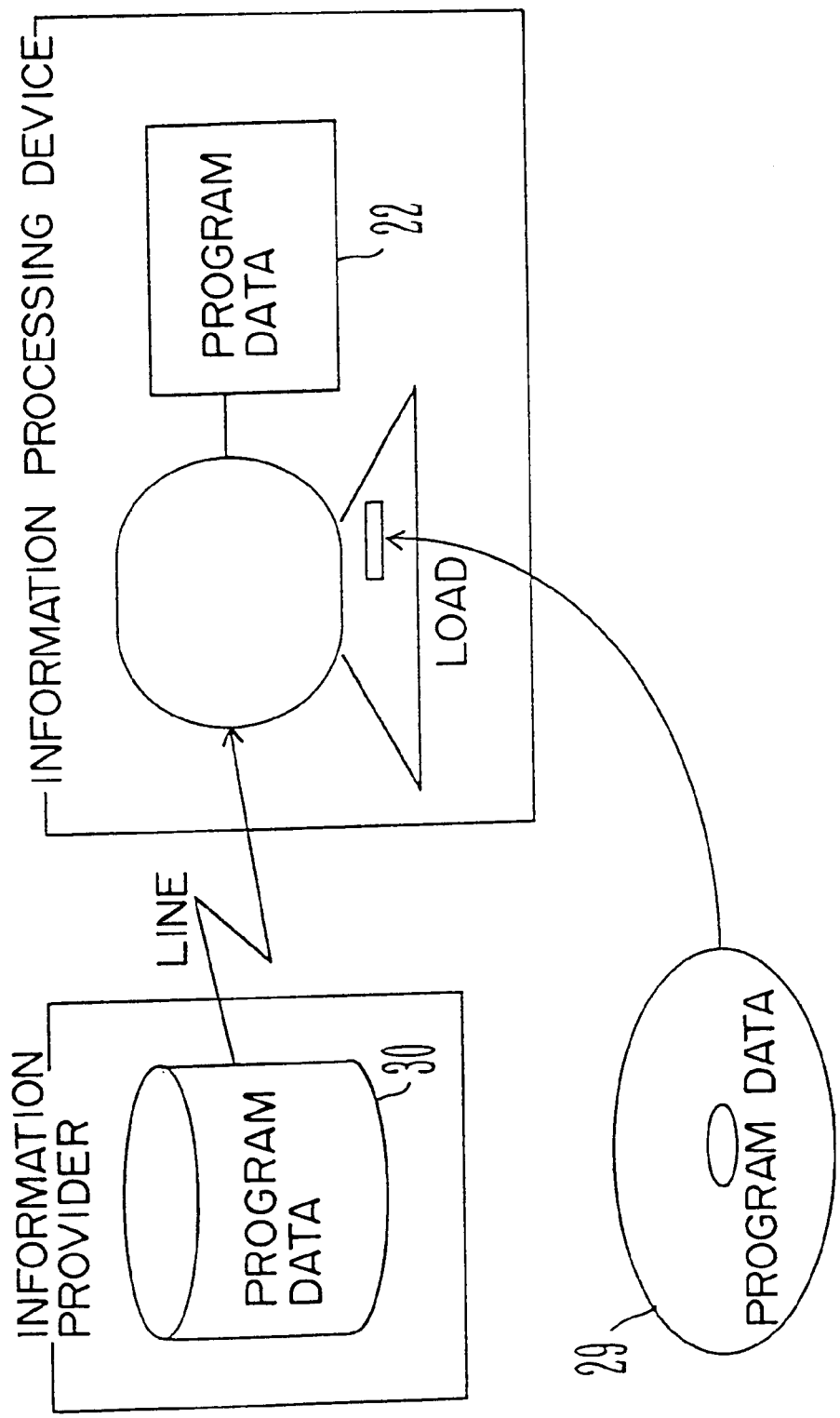
FIG. 4 shows storage media.

FIG. 4 shows computer-readable storage media for providing a program and data for the information processing device shown in FIG. 3. The program and data stored on the portable storage medium 29 and in an external database 30 are loaded onto the memory 22. The CPU 21 executes the program using the data, and performs a necessary process.

The information processing device shown in FIG. 3 is used not only for operational input to and the control of the robot system shown in FIG. 2, but also for the above described robot simulation. In this case, the CPU 21 executes a program for a kinetics simulation, etc. according to an operational input from the input device 23, and displays the result on the screen of the output device 24.

Figure 5:
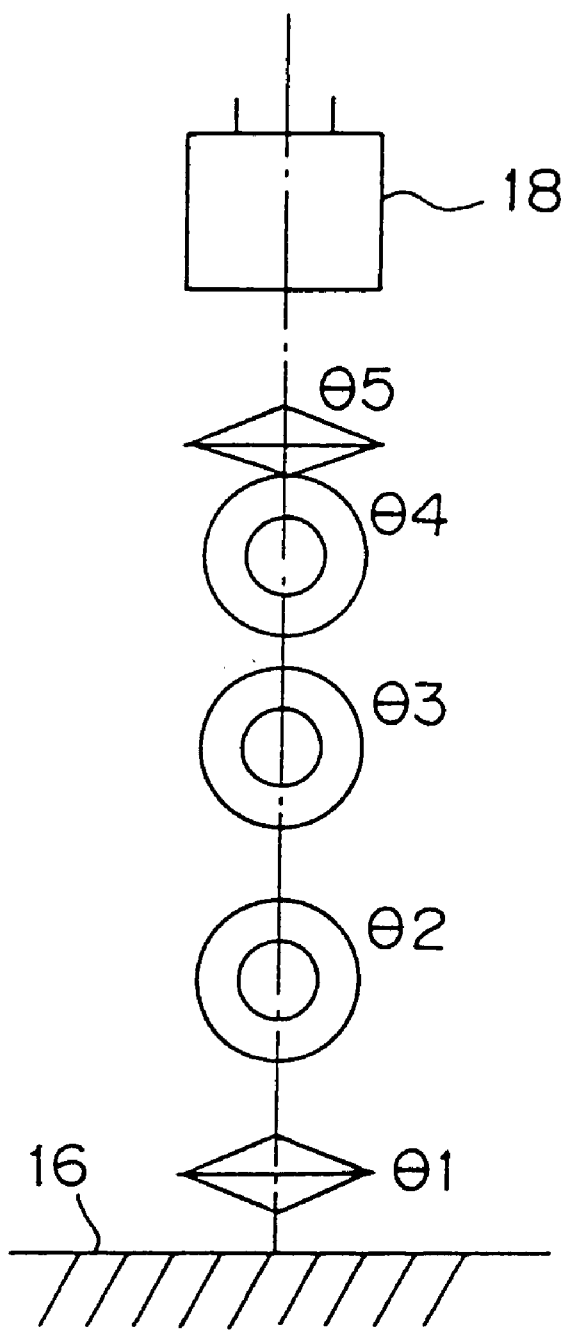
FIG. 5 shows a joint angle coordinate system.

Described below are the coordinate systems of the robot 11 shown in FIG. 2. The robot 11 has five rotatable joints having respective rotation angles (joint angles) of a variable $\theta 1, \theta 2, \theta 3, \theta 4$, and $\theta 5$. The coordinate system represented by these variables is hereinafter referred to as a joint angle coordinate system. When the manipulator 17 takes a full-straight orientation, the relationship among the joints can be shown in FIG. 5. The rotation axes of $\theta 1$ and $\theta 5$ are in a straight line.

Figure 6:
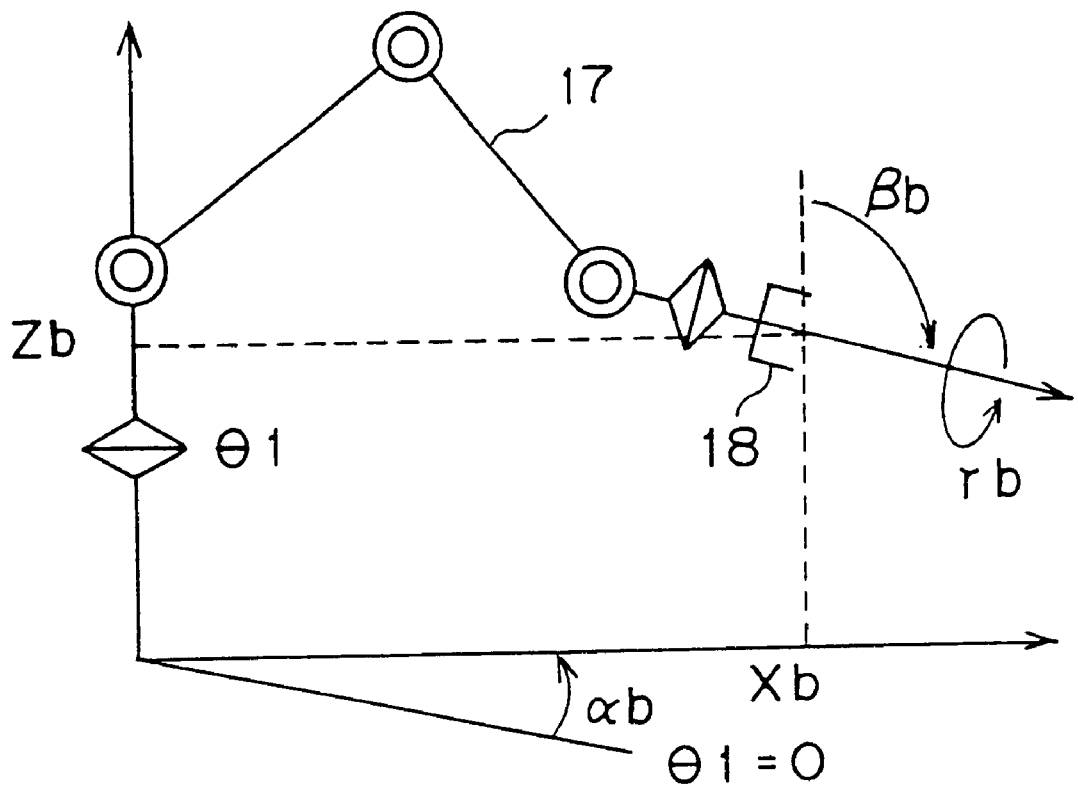
FIG. 6 shows a base coordinate system.

The base coordinate system representing the position and orientation of the hand 18 includes, as shown in FIG. 6, five variables $\alpha b, Xb, Zb, \beta b$, and $\gamma b$. Among them, the rotation angles $\alpha b$ and $\gamma b$ respectively match $\theta 1$ and $\theta 5$ of the joint angle coordinate system.

The plane Xb–Zb is vertical to the surface of the base plate 16. The origin matches the intersection between the surface of the base plate 16 and the rotation axis of $\theta 1$. The plane Xb–Zb rotates with the rotation angle $\alpha b$. The rotation angle $\beta b$ is defined in the plane Xb–Zb, and indicates the direction of the rotation axis of $\gamma b$ relative to the positive direction of the Zb axis. Thus, the position of the hand 18 is represented by the variables $\alpha b, Xb$, and $Zb$, and the orientation is represented by the variables $\beta b$ and $\gamma b$.

Figure 7:
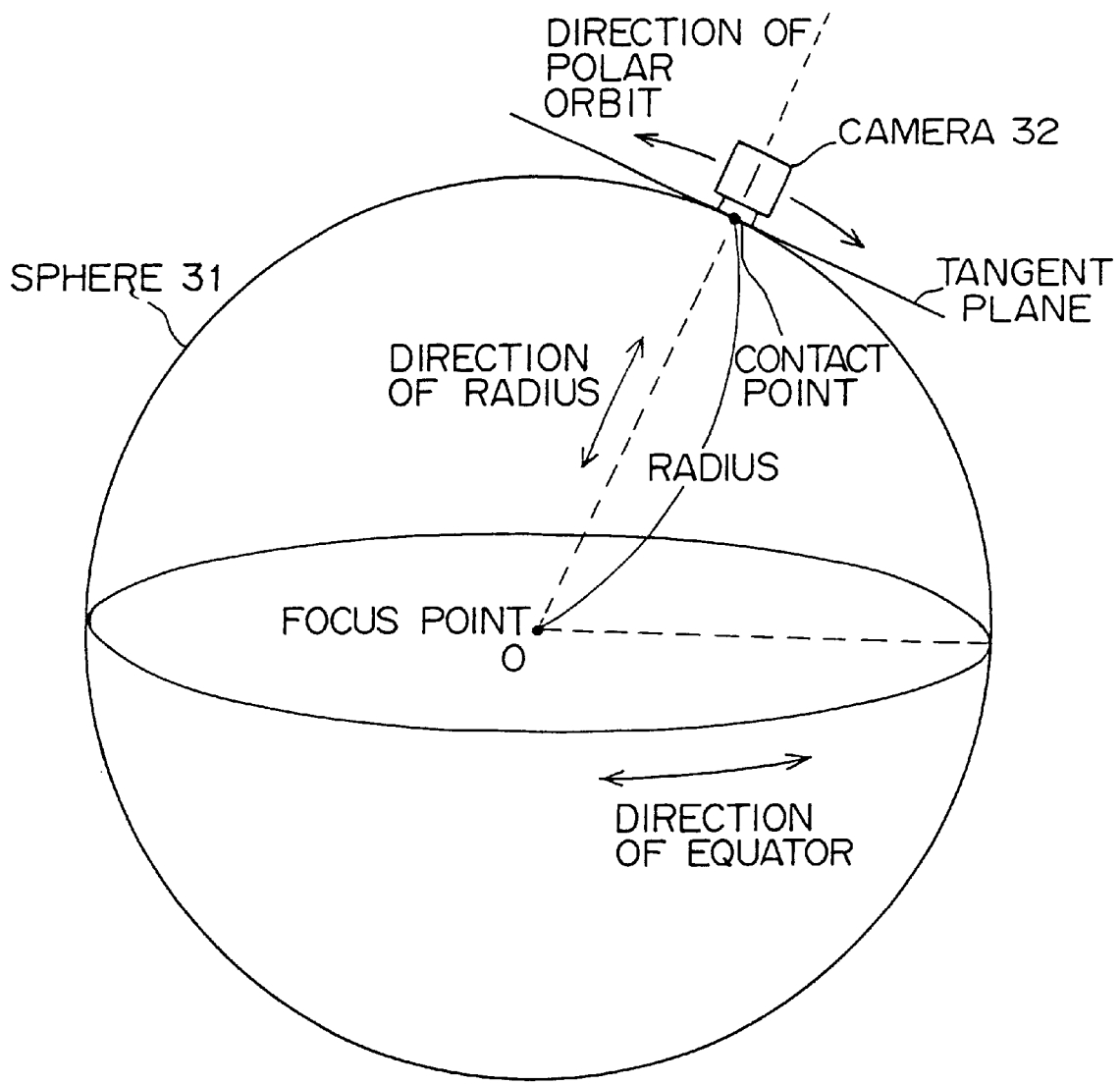
FIG. 7 shows a sphere.

Described below is the method of representing a virtual sphere used to set a plane for restricting the movable range of the hand 18. As shown in FIG. 7, a sphere 31 can be defined by designating the position of the center O in the three-dimensional space and the radius. A virtual camera 32 having the center as a focus point is provided on the surface of the sphere 31. It is assumed that the camera 32 can be freely moved on the sphere. The tangent plane, which has the intersection between the axis of the lens of the camera 32 and the surface of the sphere as a contact point, is defined as the display plane of the image captured by the camera 32, and is associated with the display plane of the three-dimensional CG.

At this time, the camera 32 can be rotated on the surface of the sphere by 360° in the direction of the equator, and 360° in the direction of the polar orbit. In addition, if the radius can be set from 0 to the infinite, the camera 32 can capture the image in an arbitrary two-dimensional plane in the three-dimensional space.

As a method of representing the position and orientation of the camera 32, for example, a Denavit-Hartenberg model (DH model) which is often used to represent the movement of a robot can be utilized. In the DH model, a robot is assumed to be a linked mechanism formed by a plurality of links coupled by joints. A three-dimensional coordinate system is defined for each joint, and the relative relationship among the coordinate systems is represented by four parameters (Basic Robot Engineering Control, P52–56, by Kensuke Hasegawa and Ryosuke Masuda, published by Shokodo). In this example, the parameters are called DH parameters.

The DH model of the virtual robot (arbitrary view point robot) for representing an arbitrary position and orientation using the camera 32 has the first, second, third, fourth, and fifth joints sequentially coupled using links having the length of 0. The first, second, third, fourth, and fifth camera coordinate systems (joint coordinate systems) are respectively set to the joints. The origin of the first camera coordinate system is, for example, connected to the origin of the absolute coordinate system with a finite-length link, and is fixed to the center O of the sphere 31. The length of the link depends on the position of the center O. The origins of the other camera coordinate systems are all degenerated to the center O.

Figure 8:
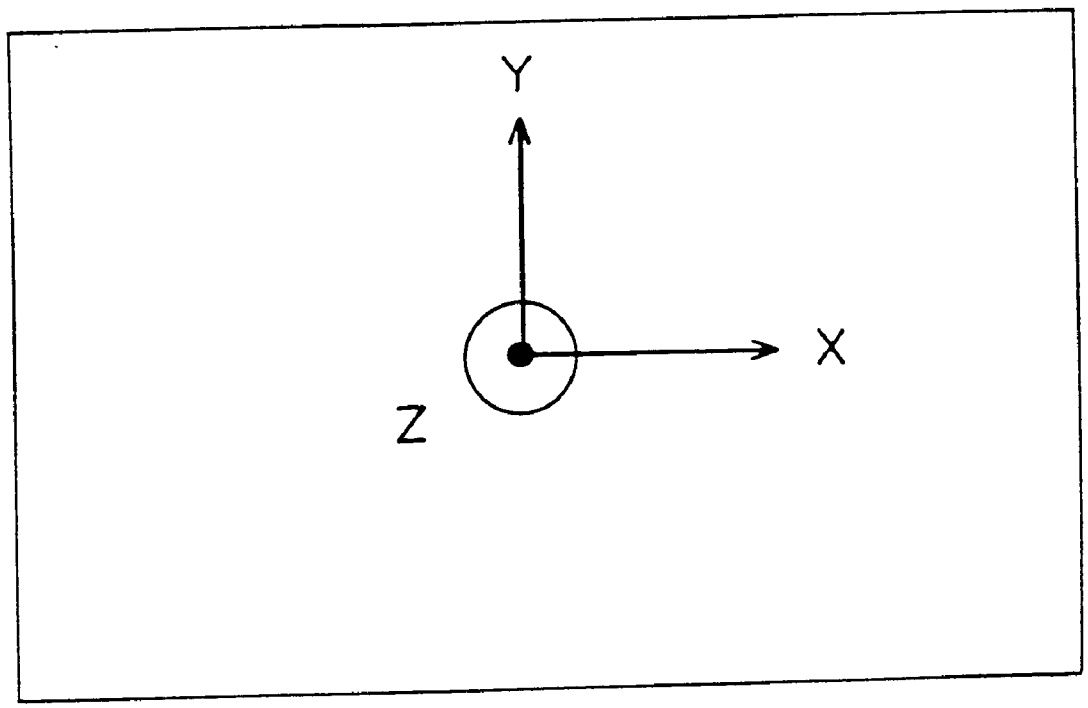
FIG. 8 shows the first camera coordinate system.

The first joint is a fixed type. The second, third, and fourth joints are a rotational type. The fifth joint is a translational type. FIG. 8 shows the state of the first camera coordinate system viewed from the positive direction of the Z axis toward the origin.

Figure 9:
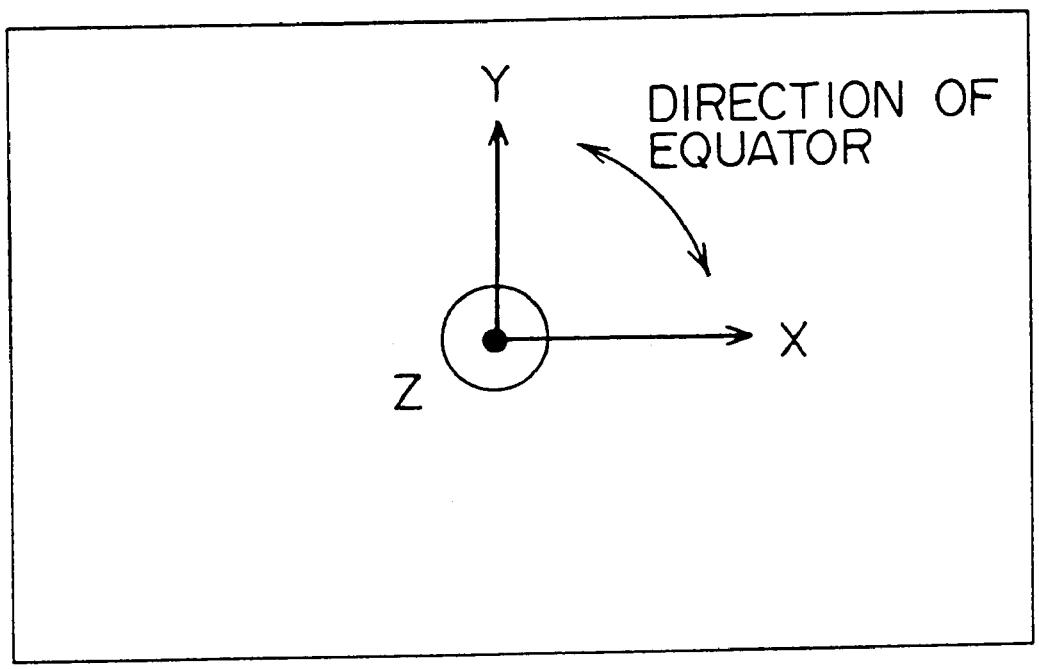
FIG. 9 shows the second camera coordinate system.

The second joint rotates in the direction of the equator, and the corresponding second camera coordinate system matches the first camera coordinate system as shown in FIG. 9. Therefore, the DH parameters of the second camera coordinate system are (0, 0, 0, 0).

Figure 10:
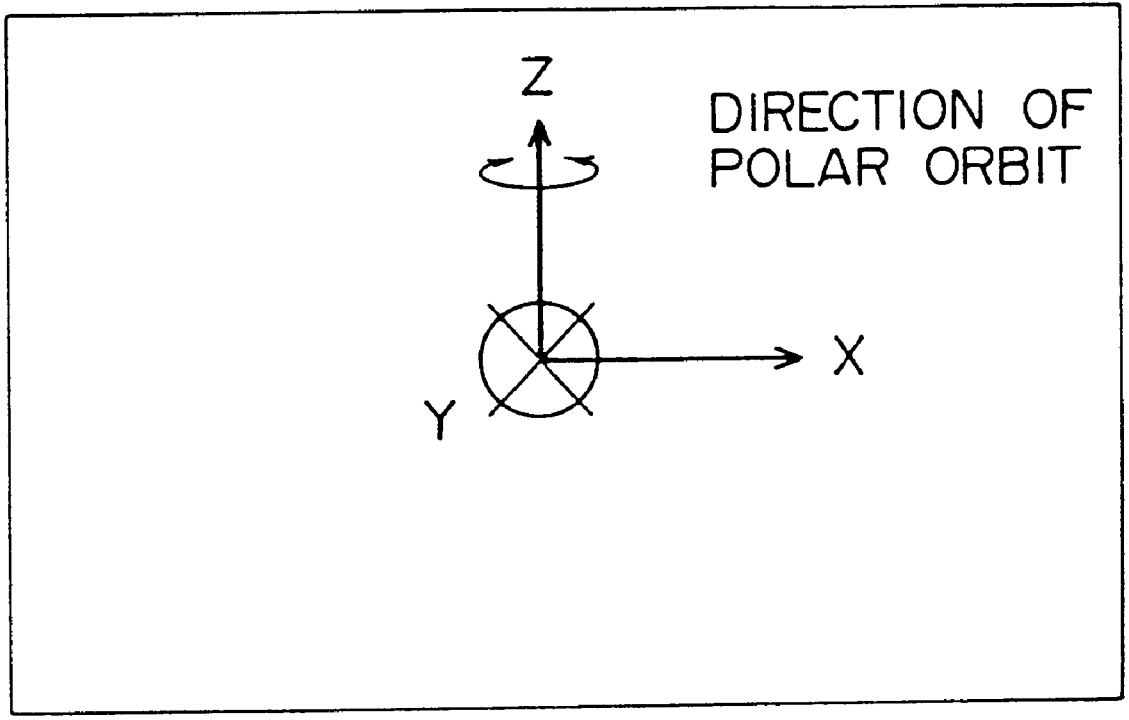
FIG. 10 shows the third camera coordinate system.
Figure 11:
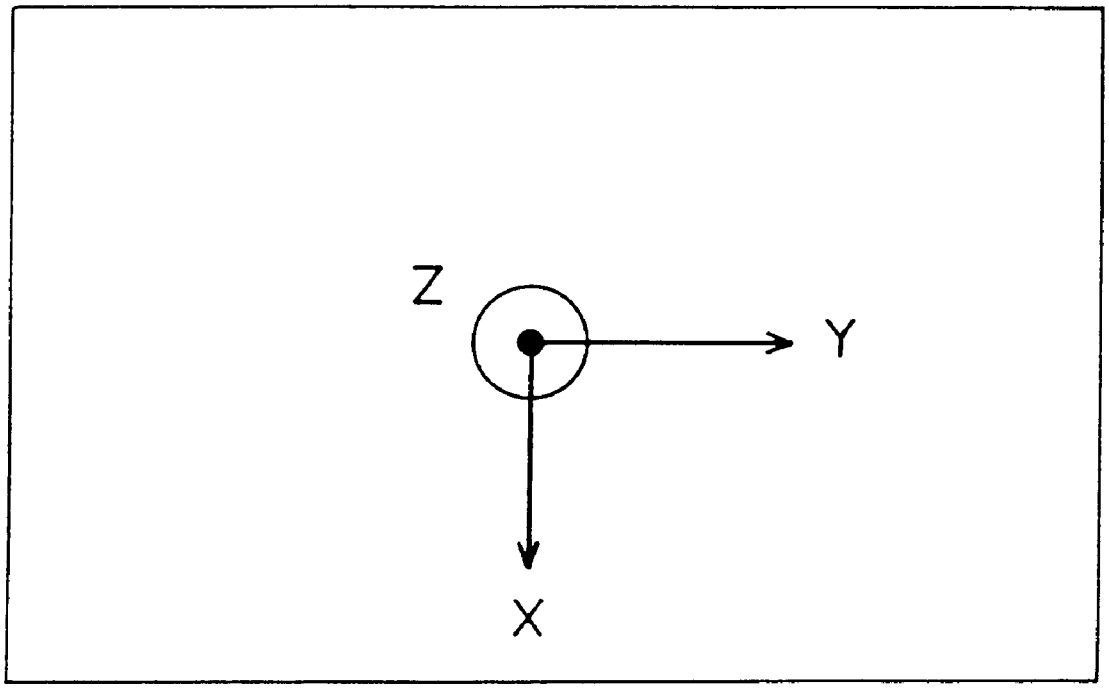
FIG. 11 shows the fourth camera coordinate system.

The third joint rotates in the direction of the polar orbit, and the corresponding third camera coordinate system is represented as shown in FIG. 10. The DH parameters of the third camera coordinate system are $(0, 0, -\pi/2, 0)$. The fourth joint is provided as a dummy for changing the direction of the camera 32. The corresponding fourth camera coordinate system is represented as shown in FIG. 11. The DH parameters of the fourth camera coordinate system are $(0, 0, \pi/2, -\pi/2)$.

Figure 12:
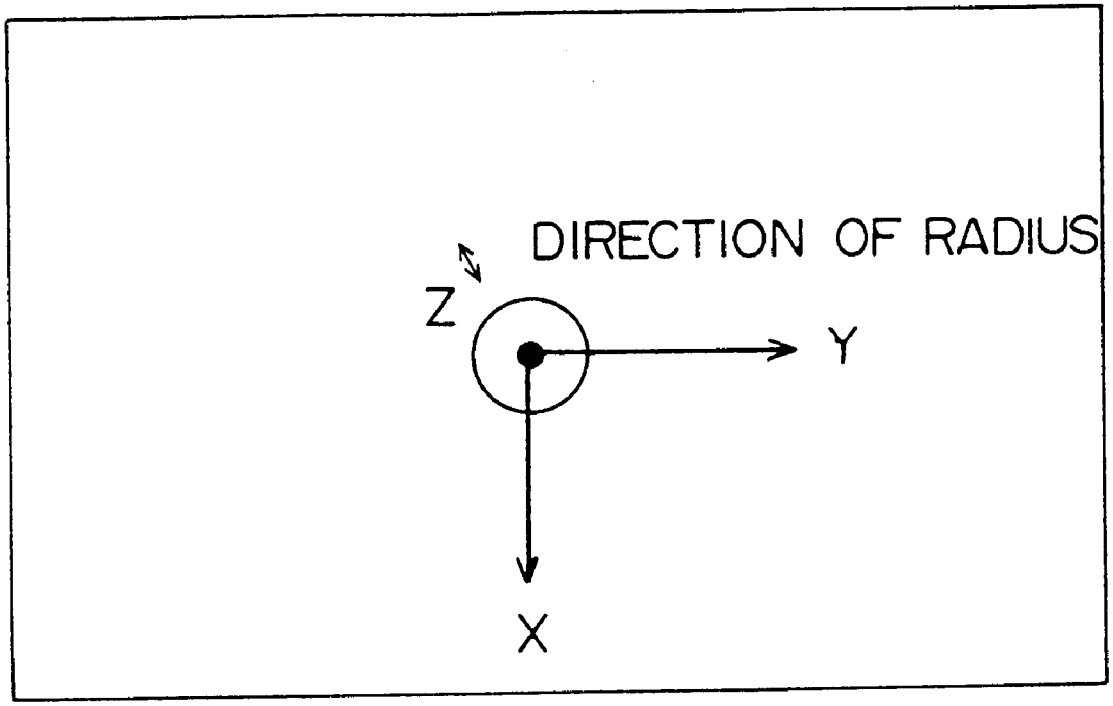
FIG. 12 shows the fifth camera coordinate system.

The fifth joint slides in the radius direction, and the corresponding fifth camera coordinate system matches the fourth camera coordinate system as shown in FIG. 12. Therefore, the DH parameters of the fifth camera coordinate system are (0, 0, 0, 0).

Using the above described DH model, the position of the camera 32 can be determined by designating the rotation angles in the directions of the equator and the polar orbit, and the translational distance in the radius direction. Based on the determined position, the movable plane of the hand 18 can be set.

Figure 13:
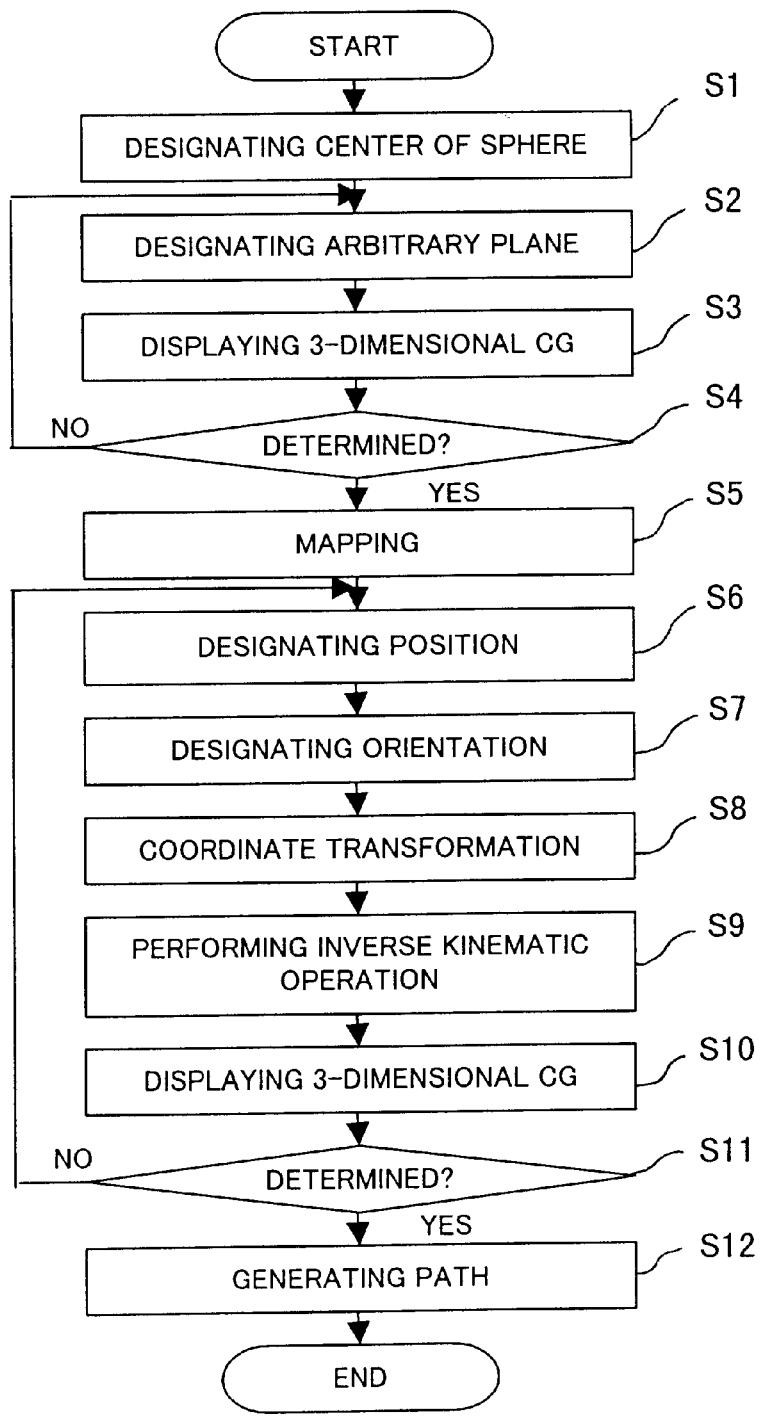
FIG. 13 is a flowchart of a positioning process.
Figure 14:
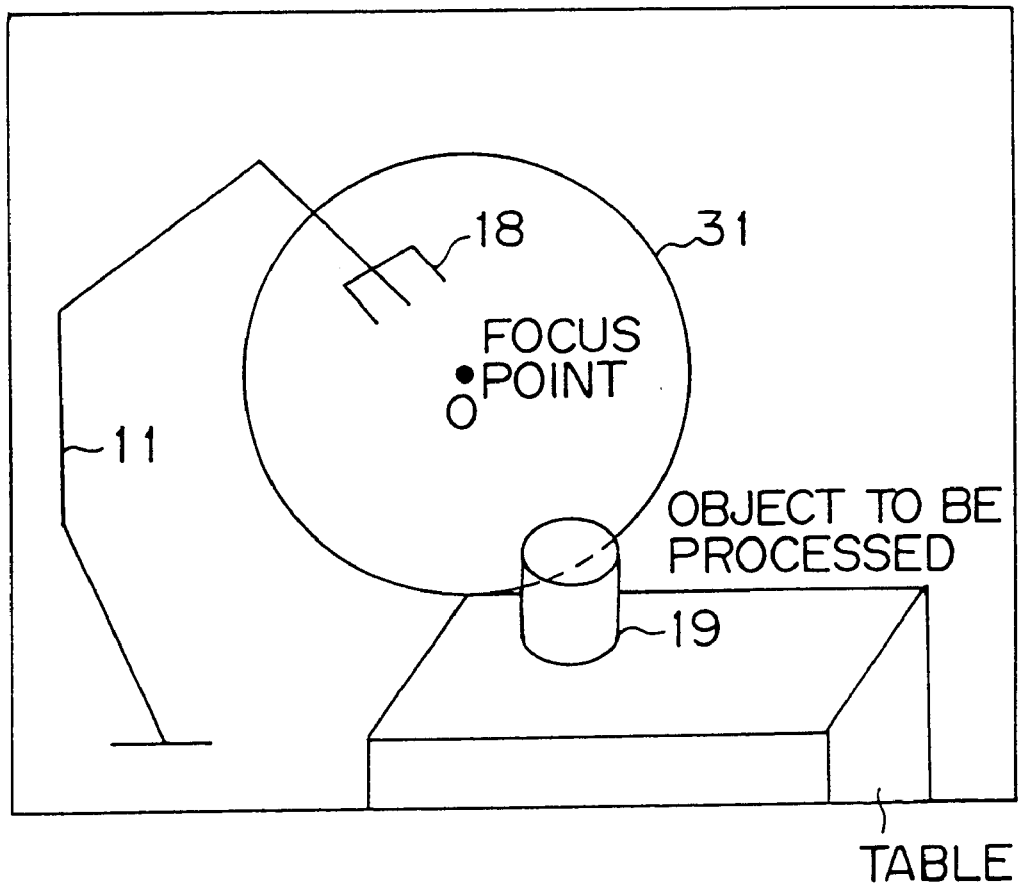
FIG. 14 shows the first operation screen.

Described below is the process of positioning the hand 18. FIG. 13 is a flowchart of the positioning process. The process is used in a simulation of a robot system or an actual operation. First, as shown in FIG. 14, the operator designates as the position of the center O (focus point) of the sphere 31 an arbitrary point in the three-dimensional space containing the robot 11 and the object 19 (cylinder) to be processed (step S1).

In this example, the object 19 is placed on a table, and the position of the center O is designated in the absolute coordinate system. For example, when the position of the center O is set in the vicinity of the center of the space in which the object 19 can move around, the following operations can be easily performed.

Figure 15:
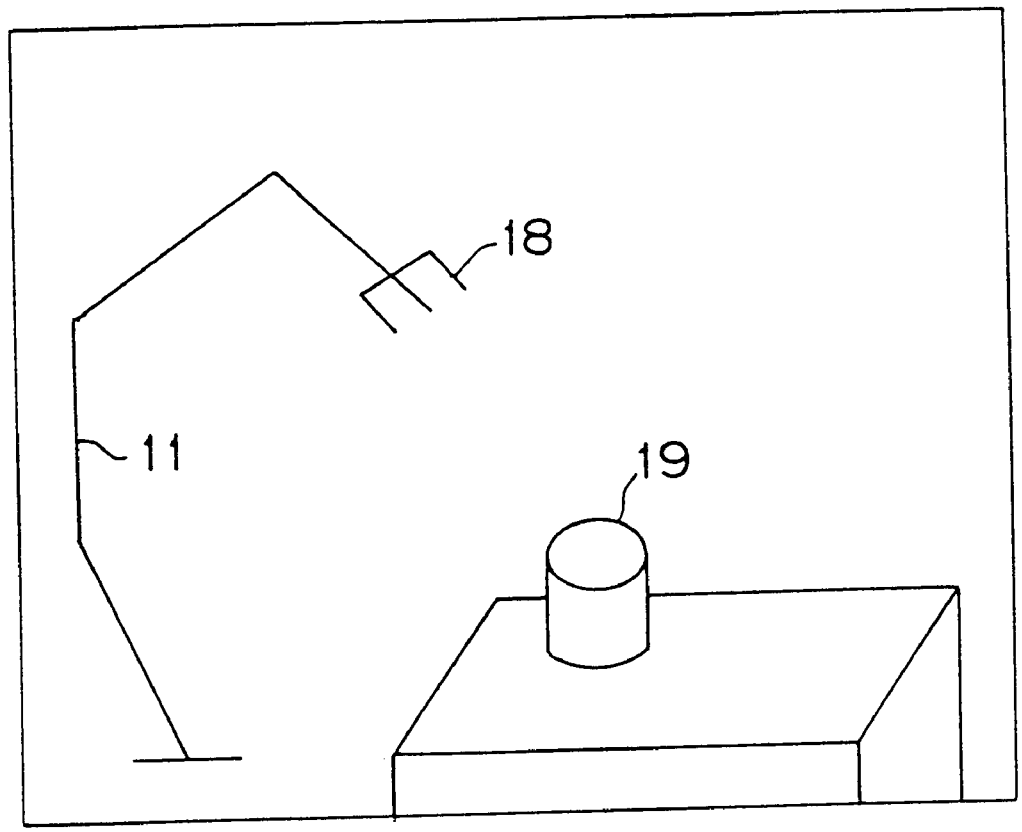
FIG. 15 shows the second operation screen.

When the center O is designated, the robot 11, the object 19, etc. in the vicinity are displayed on the tangent plane (initial plane) on the sphere 31 as shown in FIG. 15. The parameters (the amount of rotation in the direction of the equator, the amount of rotation in the direction of the polar orbit, and the length in the radius direction) which determine the initial plane are preliminarily assigned as initial values.

Figure 16:
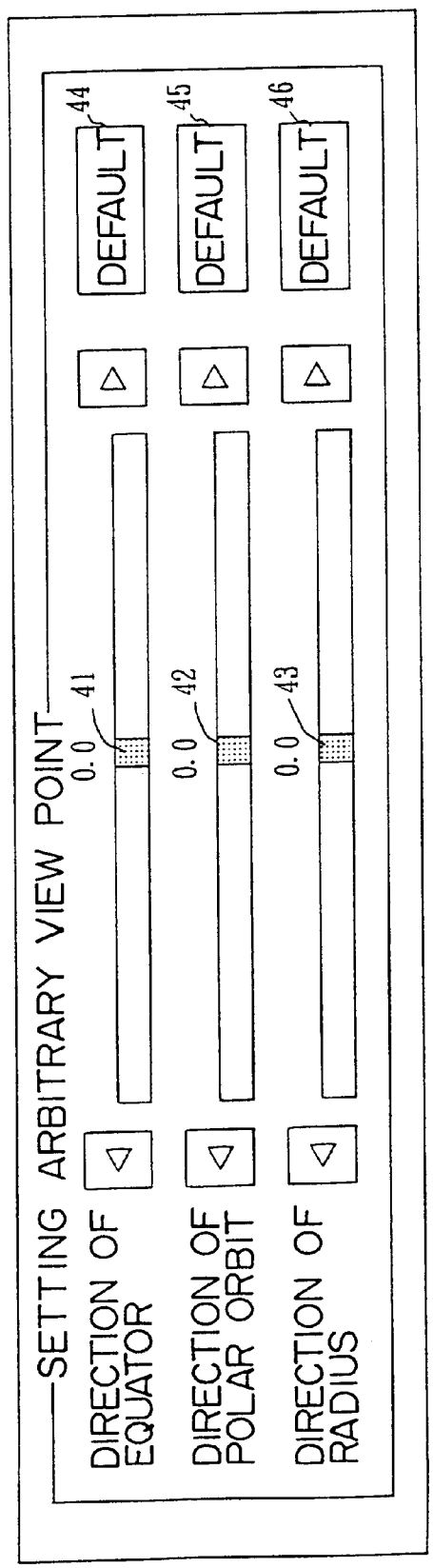
FIG. 16 shows a setting screen.

Next, the operator designates an arbitrary tangent plane of the sphere 31 through the graphical user interface (GUI) (step S2). At this time, the setting screen as shown in FIG. 16 is displayed on the display device. The amount of rotation in the direction of the equator, the amount of rotation in the direction of the polar orbit, and the length in the radius direction can be designated by sliding volumes 41, 42, and 43. If defaults 44, 45, and 46 are designated, the defaults of the amount of rotation in the direction of the equator, the amount of rotation in the direction of the polar orbit, and the length in the radius direction can be automatically set. The order of setting the parameters can be arbitrarily determined.

The information processing device converts the input value of each parameter into the rotation angle or the translational distance of each joint of the DH model of the above described camera 32, performs a kinematics operation based on the conversion result, and determines the position of the camera 32. Then, the three-dimensional CG is generated on the tangent plane having the determined position as a contact point, and is then displayed in the display window (step S3).

The operator checks whether or not the displayed screen contains the current position and the target position of the hand 18, and inputs an instruction to or not to determine the display screen (step S4). If the screen is not to be determined, the processes in and after step S2 are repeated.

Figure 17:
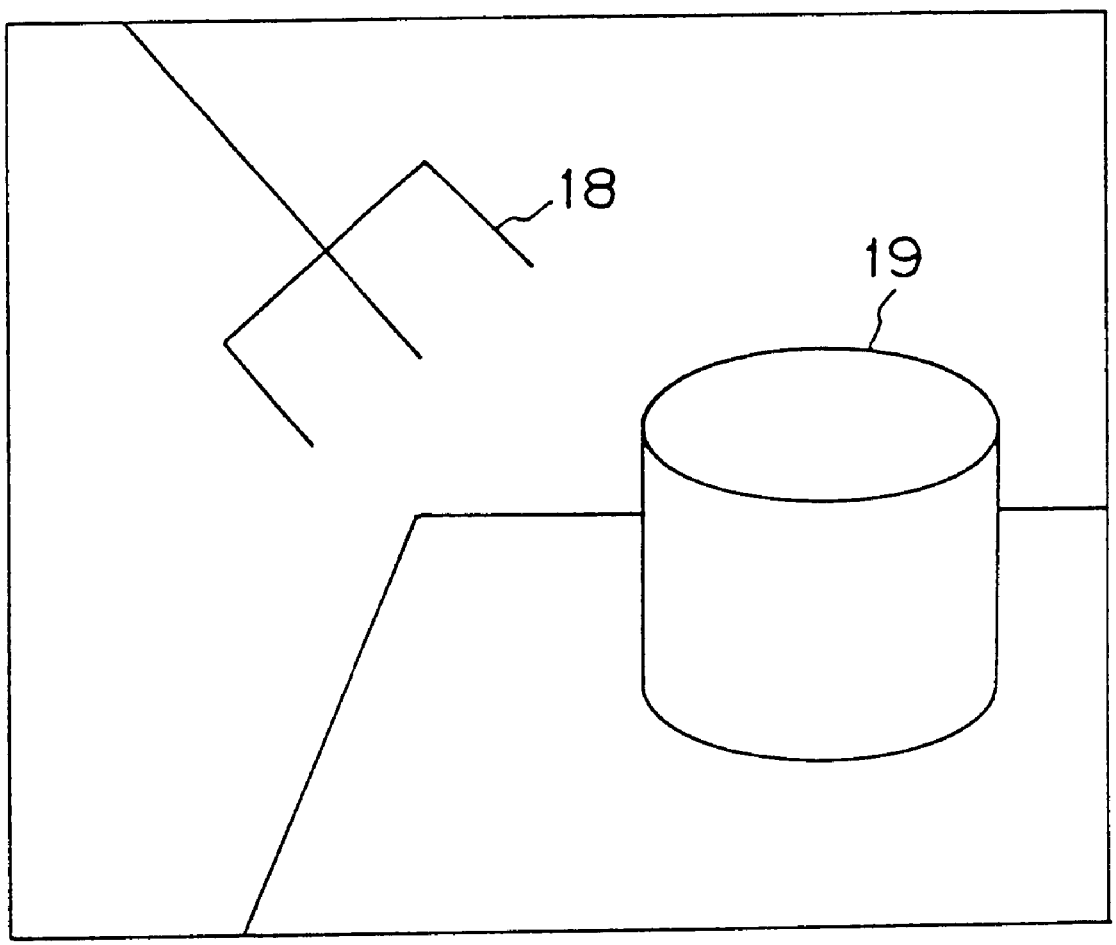
FIG. 17 shows the third operation screen.
Figure 18:
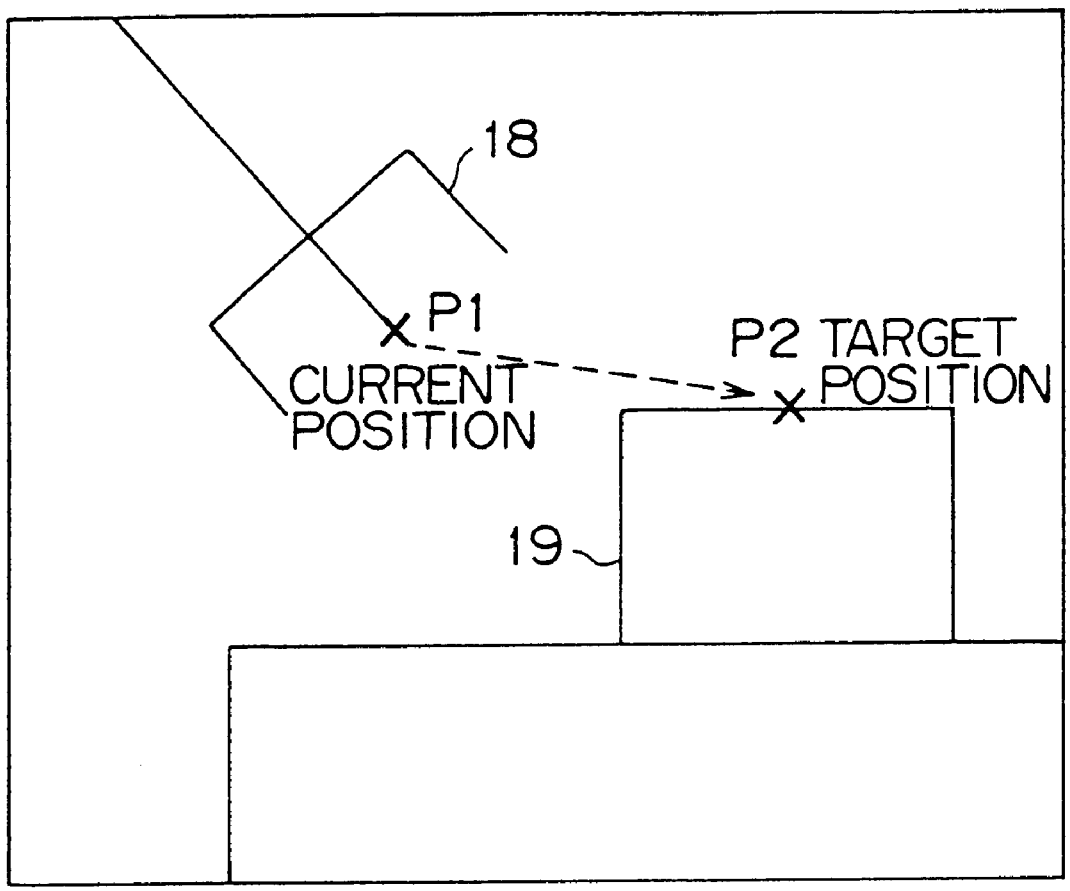
FIG. 18 shows the fourth operation screen.

FIG. 17 shows the screen on which an amendment is made to the length in the radius direction shown in FIG. 15, and the vicinity of the hand 18 and the object 19 is enlarged. The operator rotates the camera 32 in the direction of the polar orbit to hold the object 19 on the table with the hand 18. Then, as shown in FIG. 18, the operator amends the display screen such that the current position P1 of the hand 18 and the target position P2 right above the object 19 can be on the same plane. Then, the operator determines the screen. Thus, the movable area of the hand 18 is limited to the display plane.

When the screen is determined, the information processing device performs a mapping process in the three-dimensional space on the determined screen and the absolute coordinate system space (step S5). The operator designates the target position and the target orientation of the hand 18 in the display window using a pointing device such as a mouse, etc. (steps S6 and S7).

At this time, for example, the two-dimensional coordinates on the display screen are designated as a target position using the left button of the mouse, and the target orientation is designated using the right button of the mouse. Otherwise, the information processing device can automatically determine the target orientation without the operator designating it. In this case, for example, the orientation of the hand 18 is determined such that the hand 18 faces the direction (vertical to the screen) of the normal vector on the displayed two-dimensional plane.

Then, the information processing device transforms the coordinates from the absolute coordinate system to the base coordinate system (step S8) for the designated target position and orientation, and then performs an inverse kinematics operation to transform the target position and orientation from the base coordinate system to the joint angle coordinate system (step S9).

Figure 19:
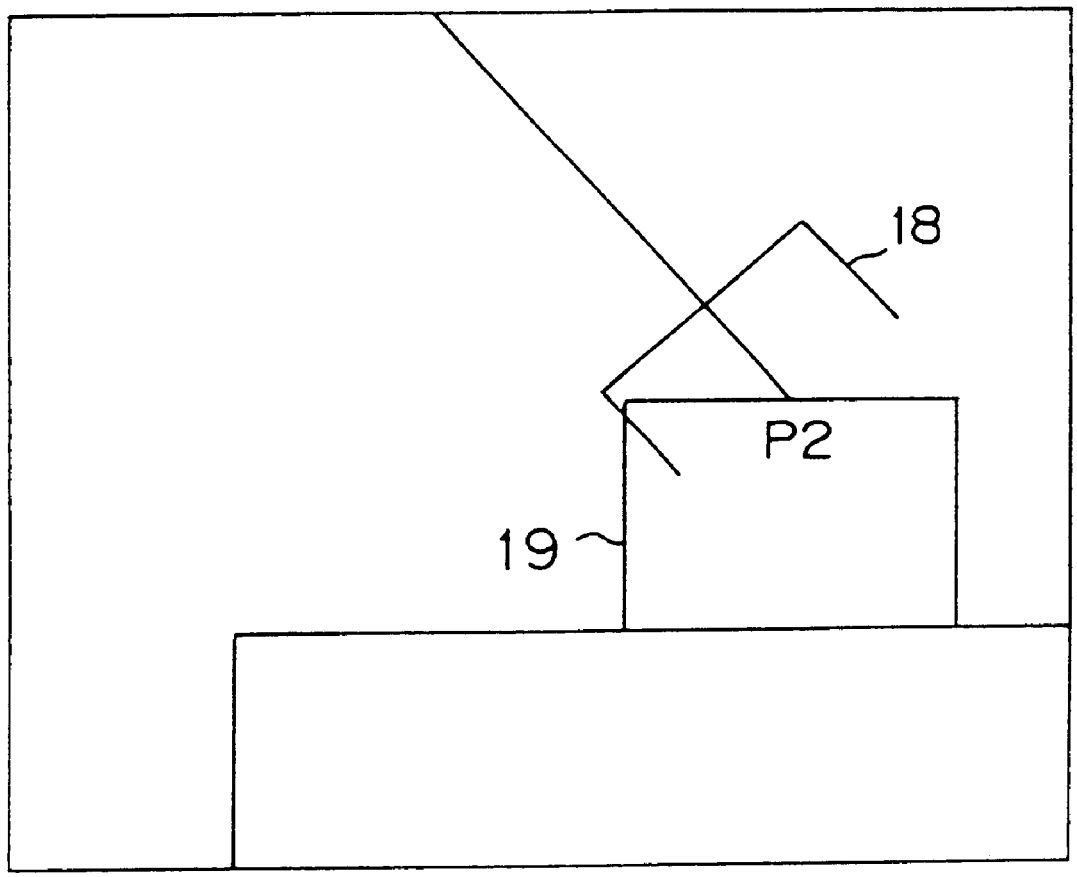
FIG. 19 shows the fifth operation screen.

A kinematics operation is performed based on the obtained rotation angle of each joint angle, and the image of the hand 18 at the target position is displayed in the three-dimensional manner (step S10). When the target position P2 shown in FIG. 18 is designated, for example, an image as shown in FIG. 19 is displayed. The operator determines whether or not the displayed target position and orientation can be accepted, and inputs an instruction to or not to determine the position and orientation (step S11). The target position and orientation are not determined, the processes in and after step S6 are repeated.

When the target position and orientation are determined, the information processing device generates a path from the current position and orientation of the robot 11 to its target position and orientation (step S12), thereby terminating the process. In a robot simulation, images of the moving hand 18 are displayed based on the generated path. When the robot 11 shown in FIG. 2 is actually. operated, the control signal corresponding to the generated path is output to the actuator 12. In the case shown in FIG. 19, it is assumed that the hand 18 has held the object 19 at the target position P2.

In the above described positioning process, the operator can obtain an image on an arbitrary plane in the three-dimensional space with a simple operation, thereby visually recognizing the robot 11, object 19, etc. from various view points. Furthermore, a plane containing a specific portion of the robot 11 and the object 19 can be easily displayed by moving the display plane in a three-dimensional manner. It is easy to designate the position of the object 19 as a target position of the robot 11 on the above described plane, thereby easily predicting the movement of the robot 11 in its way from the current position to the target position.

It is also possible to instruct the robot 11 to perform a complicated movement by repeating the above described processes with the target position and orientation amended. For example, assume that the object 19 is moved from the position P2 to another position on the table with the object 19 held by the hand 18 as shown in FIG. 19.

Figure 20:
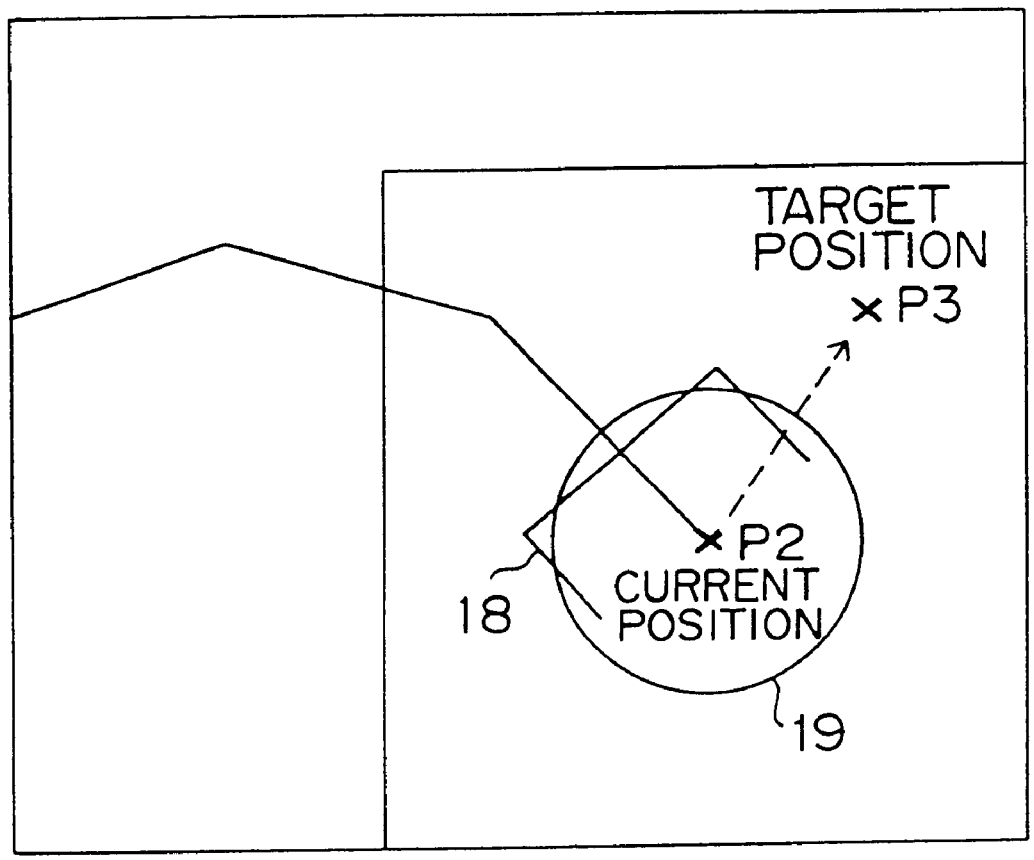
FIG. 20 shows the sixth operation screen.

In this case, the operator rotates the tangent plane in the direction of the polar orbit by 90° in step S2 to confirm the plane (on the table) along the depth of the screen. As shown in FIG. 20, the screen is amended such that the current position P2 and the target position P3 of the hand 18 can be on the same plane. Thus, an image of the plane containing the current position P2 and the target position P3 is displayed. On this screen, a new path can be generated by designating the target position P3 and the orientation of the hand 18 at the position.

Described below is the transformation of coordinates used in the positioning process shown in FIG. 13. First, the absolute coordinate system (Xa, Ya, Za, βa, γa) is defined, for example, as follows.

Origin: Same as the origin of the base coordinate system.

Xa axis: Xb axis when αb=0 in the base coordinate system

Za axis: Zb axis when αb=0 in the base coordinate system

Ya axis: direction of outer product of the direction vector of Xa axis and the direction vector of Za axis βa: Same as the rotation angle βb of the base coordinate system γa: Same as the rotation angle γb of the base coordinate system The variables (Xa, Ya, Za, βa, γa) of the absolute coordinate system are transformed into the variables (αb, Xb, Zb, βb, γb) of the base coordinate system according to the following equations.

$$\begin{bmatrix} Xb \\ 0 \\ Zb \end{bmatrix} = \begin{bmatrix} \cos(-\alpha b) & -\sin(-\alpha b) & 0 \\ \sin(-\alpha b) & \cos(-\alpha b) & 0 \\ 0 & 0 & 1 \end{bmatrix} \begin{bmatrix} Xa \\ Ya \\ Za \end{bmatrix} \quad (1)$$

$$\beta b = \beta a$$
$$\gamma b = \gamma a$$

Equation (1) is used when a tangent plane designated in step S2 is transformed into the base coordinate system. It is also used when the target position and orientation of the hand 18 designated in steps S6 and S7 are transformed into the base coordinate system in step S8.

Furthermore, the variables (αb, Xb, Zb, βb, γb) of the base coordinate system are transformed into the variables (Xa, Ya, Za, βa, γa) of the absolute coordinate system according to the following equations.

$$\begin{bmatrix} Xa \\ Ya \\ Za \end{bmatrix} = \begin{bmatrix} \cos(\alpha b) & -\sin(-\alpha b) & 0 \\ \sin(\alpha b) & \cos(\alpha b) & 0 \\ 0 & 0 & 1 \end{bmatrix} \begin{bmatrix} Xb \\ 0 \\ Zb \end{bmatrix} \quad (2)$$

$$\beta a = \beta b$$
$$\gamma a = \gamma b$$

Figure 21:
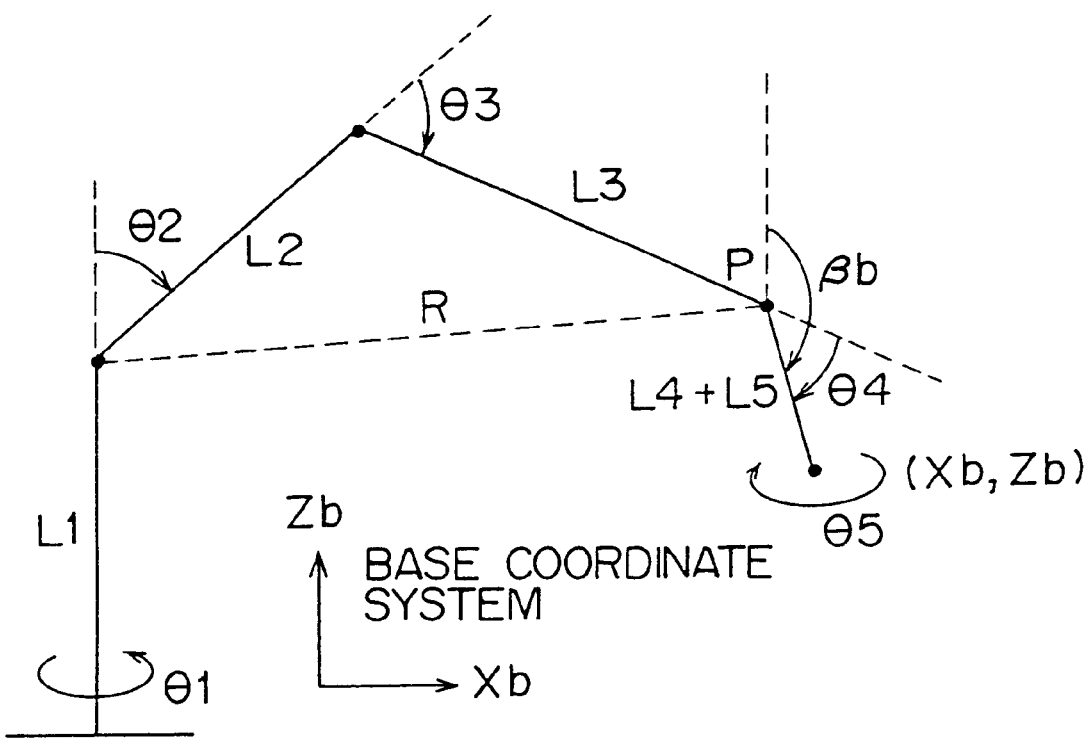
FIG. 21 shows links of a robot.

When the DH model of the robot 11 is defined as shown in FIG. 21, the length of each link is represented as L1, L2, L3, L4, and L5. At this time, the variables (θ1, θ2, θ3, θ4, 5θ) of the joint angle coordinate system are transformed into the variables (αb, Xb, Zb, βb, γb) of the base coordinate system according to the following equations.

$$\alpha b = \theta 1$$

$$\gamma b = \theta 5$$

$$Xb = L2\sin(\theta 2) + L3\sin(\theta 2 + \theta 3) + (L4+L5)\sin(\theta 2+\theta 3+\theta 4)$$

$$Zb = L1 + L2\cos(\theta 2) + L3\cos(\theta 2+\theta 3) + (L4+L5)\cos(\theta 2+\theta 3+\theta 4)$$

$$\beta b = \theta 2 + \theta 3 + \theta 4 \quad (3)$$

Equation (3) is used when, for example, a three-dimensional CG image is generated in steps S3 and S10.

The variables (αb, Xb, Zb, βb, γb) of the base coordinate system are transformed into the variables (θ1, θ2, θ3, θ4, θ5) of the joint angle coordinate system according to the following equations.

$$\theta 1 = \alpha b$$

$$\theta 5 = \gamma b$$

$$\theta 2 = a\tan(Px/Pz) - a\cos((L2^2+R^2-L3^2)/2L2 \cdot R)$$

$$\theta 3 = a\cos((R^2-L2^2-L3^2)/2L2 \cdot L3)$$

$$\theta 4 = \beta b - \theta 2 - \theta 3 \quad (4)$$

where the variable Px and Pz are defined corresponding to the position of the point P shown in FIG. 21 as follows.

$$Px = Xb - (L4+L5)\sin(\beta b)$$

$$Pz = Zb - (L4+L5)\cos(\beta b) - L1 \quad (5)$$

The distance R is defined using Px and Pz as follows.

$$R^2 = Px^2 + Pz^2 \quad (6)$$

Equation (4) is used when, for example, the target position and orientation of the hand 18 represented in the base coordinate system are transformed into the joint angle coordinate system in step S9.

Next, FIG. 22 is a flowchart of the path generating process performed in step S12 shown in FIG. 13. In this process, a command string (input data of a control signal of the control device 14) for instructing the robot 11 to perform the operations for reaching the target position and orientation from the current position and orientation of the hand 18 is generated, and is then stored in the command accumulation file provided in the memory 22 shown in FIG. 3.

When an operation to be performed is simple, a command string is generated with the path from the current position and orientation to the target position and orientation processed as a single path. When an operation to be performed is complicated, for example, the process from the current position and orientation to the target position and orientation is divided into a number of paths to generate a command string.

The information processing device first computes the amount of movement in an assigned path from the start to the end (step S21), and obtains the number (integer) of divisions of the path based on the predetermined amount of movement per command (step S22). Then, each division point is computed based on the number of divisions (step S23), and is written to the command accumulation file (step S24), thereby terminating the process.

When an assigned path corresponds to the rotation in the direction θ1 or θ5, the information processing device computes the rotation angle in the joint angle coordinate system in step S21, and computes the division points in the joint angle coordinate system in step S23. Then, in step S24, each division point is converted into a command, and is written to the command accumulation file.

When an assigned path corresponds to movement other than the rotation in the direction θ1 or θ5, the information processing device computes the moving distance in the absolute coordinate system in step S21, and computes the division points in the absolute coordinate system in step S23. Then, in step S24, each division point is transformed into the base coordinate system by equations (1), and into the joint angle coordinate system by equations (4). Then, each division point in the joint angle coordinate system is converted into a command, and is written to the command accumulation file.

In a robot simulation, images of the movements of the hand 18 are displayed by performing kinematics operations according to the command string stored in the command accumulation file. When the robot 11 shown in FIG. 2 is operated, the hand 18 is actually moved by outputting a control signal corresponding to the command string to the actuator 12.

Details of the kinematics operation of a robot having a manipulator, the inverse kinematics operation, and the generation of a path are explained in P58 through P78 of the above described 'Basic Robot Engineering Control' (by Kensuke Hasegawa and Ryosuke Masuda, published by Shokodo).

In the above described embodiments, specific restrictions are placed on the operations of a robot, and the position and orientation are represented by five degrees of freedom (five parameters) as shown in FIGS. 2, 5, 6, 21, etc. However, the position and orientation of a robot is generally represented by six degrees of freedom. The interface according to the present invention can be applied to any robot regardless of the number of degrees of freedom.

Figure 23:
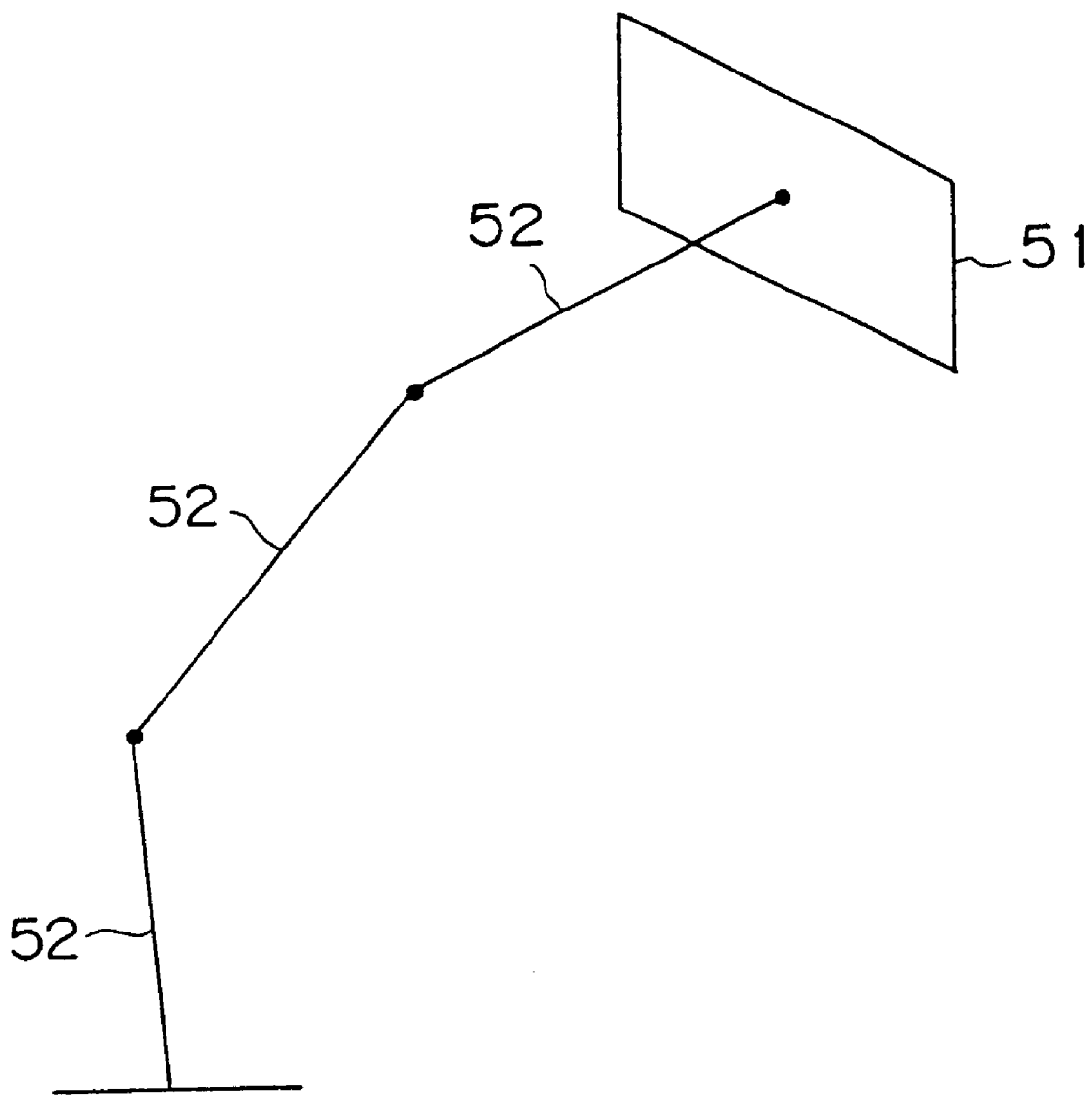
FIG. 23 shows a virtual robot.

In addition, according to the embodiments of the present invention, a virtual sphere is used in designating an arbitrary two-divisional plane in a three-dimensional space. It is obvious that the method of setting a two-dimensional plane is not limited to this example. For example, as shown in FIG. 23, a two-dimensional plane 51 is defined in a three-dimensional space. Then, using the two-dimensional plane 51 as a substitute for the end effector of a virtual robot formed by links 52 of a finite length, the two-dimensional plane 51 can be set to an arbitrary position and orientation.

According to the present embodiment, an end effector is an object to be positioned. However, for example, a specific joint and link can be set at a target position and orientation. When a robot can move in a three-dimensional space using legs, wheels, a rocket engine, a propeller, etc., the body of the robot can be moved to a target position.

Furthermore, the interface according to the present invention can be applied not only to a robot working on the ground, but also to a robot working anywhere, such as, underground, underwater, in the air, in space, etc. For example, when it is used for remote control of the robot hand system provided in a satellite, the robot hand can be more freely positioned, and an arbitrary position can be easily set in addition to the setting in a predetermined coordinate system.

According to the present invention, the operator can predict the operation of the robot from the current position to the target position when the robot is positioned in a three-dimensional space, thereby improving the operation efficiency. Thus, the robot can be easily positioned anywhere in the three-dimensional space.

What is claimed is:

1. An interface apparatus comprising:

a plane designation unit to designate an arbitrary plane, on which a robot moves to be positioned, in a three-dimensional space, by arbitrarily changing a position and an orientation of the plane in the three-dimensional space according to a parameter value that is changed dynamically; and a display unit to graphically display an image of the robot on the designated arbitrary plane for positioning the robot, wherein the plane designation unit designates the arbitrary plane by using a tangent plane in contact with a surface of a virtual sphere in the three-dimensional space and by arbitrarily changing a radius of the sphere and a position of a contact point of the tangent plane on the sphere.

2. The apparatus according to claim 1, further comprising:

a position designation unit to designate a target position of a specific portion of the robot on a displayed screen.

3. The apparatus according to claim 2, further comprising:

an orientation designation unit to designate a target orientation of the specific portion of the robot on the displayed screen.

4. The apparatus according to claim 2, wherein:

said display unit graphically displays an image of the specific portion of the robot at the target position when the target position is designated.

5. The apparatus according to claim 2, further comprising:

a mapping unit to associate the designated plane with a plane on the displayed screen, wherein said position designation unit limits a movable range, of the specific portion of the robot, to the designated plane.

6. An interface apparatus comprising:

a plane designation unit to designate an arbitrary plane, on which a robot moves to be positioned, in a three-dimensional space; and a display unit to graphically display an image of the robot on the designated arbitrary plane for positioning the robot, wherein said plane designation unit designates the arbitrary plane by using a tangent plane in contact with a surface of a virtual sphere in the three-dimensional space and by arbitrarily changing a radius of the sphere and a position of a contact point of the tangent plane on the sphere.

7. An interface apparatus, comprising:

a mapping unit to associate a plane, on which a robot moves to be positioned, in a three-dimensional space, with a display plane;

a display unit to graphically display on the display plane an image of the robot on the plane in the three-dimensional space for positioning the robot;

a plane designation unit to designate a parameter indicating an arbitrary position and an arbitrary orientation of the plane in the three-dimensional space; and a change unit to arbitrarily change the position and the orientation of the plane in the three-dimensional space by changing the parameter dynamically, wherein the plane designation unit designates the plane by using a tangent plane in contact with a surface of a virtual sphere in the three-dimensional space and by arbitrarily changing a radius of the sphere and a position of a contact point of the tangent plane on the sphere.

8. A computer-readable storage medium for storing a program used to direct a computer to perform operations comprising:

setting an arbitrary plane, on which a robot moves to be positioned, in a three-dimensional space, by arbitrarily changing a position and an orientation of the plane in the three-dimensional space according to a parameter value that is changed dynamically; and graphically displaying an image of the robot on the set plane for positioning the robot, wherein the setting designates the arbitrary plane by using a tangent plane in contact with a surface of a virtual sphere in the three-dimensional space and by arbitrarily changing a radius of the sphere and a position of a contact point of the tangent plane on the sphere.

9. The computer-readable storage medium according to claim 8, further storing a program used to direct a computer to perform operations comprising setting a target position of a specific portion of the robot on the displayed screen.

10. A computer-readable storage medium for storing a program used to direct a computer to perform operations comprising:
   associating a plane, on which a robot moves to be positioned, in a three-dimensional space with a display plane;
   graphically displaying on the display plane an image of the robot on the plane in the three-dimensional space for positioning the robot;
   setting a parameter indicating an arbitrary position and an arbitrary orientation of the plane in the three-dimensional space; and
   arbitrarily changing the position and the orientation of the plane in the three-dimensional space by amending the parameter dynamically,
   wherein the setting designates the plane by using a tangent plane in contact with a surface of a virtual sphere in the three-dimensional space and by arbitrarily changing a radius of the sphere and a position of a contact point of the tangent plane on the sphere.

11. An interface apparatus comprising:
   a plane designation unit to designate an arbitrary plane, on which a robot makes complex movements to be positioned, in a three-dimensional space, by arbitrarily changing a position and an orientation of the plane in the three-dimensional space according to a parameter value that is changed dynamically; and
   a display unit to graphically display an image of the robot on the designated arbitrary plane for positioning the robot,
   wherein the plane designation unit designates the arbitrary plane by using a tangent plane in contact with a surface of a virtual sphere in the three-dimensional space and by arbitrarily changing a radius of the sphere and a position of a contact point of the tangent plane on the sphere.

12. The apparatus according to claim 11, further comprising a position designation unit to designate a target position of a specific portion of the robot on a displayed screen.

13. The apparatus according to claim 12, further comprising an orientation designation unit to designate a target orientation of the specific portion of the robot on the displayed screen.

14. The apparatus according to claim 12, wherein the display unit graphically displays an image of the specific portion of the robot at the target position when the target position is designated.

15. The apparatus according to claim 12, further comprising a mapping unit to associate the designated plane with a plane on the displayed screen, wherein the position designation unit limits a movable range, of the specific portion of the robot, to the designated plane.

16. An interface apparatus comprising:
   a plane designation unit to designate an arbitrary plane, on which a robot makes complex movements to be positioned, in a three-dimensional space; and
   a display unit to graphically display an image of the robot on the designated arbitrary plane for positioning the robot,
   wherein the plane designation unit designates the arbitrary plane by using a tangent plane in contact with a surface of a virtual sphere in the three-dimensional space and by arbitrarily changing a radius of the sphere and a position of a contact point of the tangent plane on the sphere.

17. An interface apparatus, comprising:
   a mapping unit to associate a plane, on which a robot makes complex movements to be positioned in a three-dimensional space, with a display plane;
   a display unit to graphically display on the display plane an image of the robot on the plane in the three-dimensional space for positioning the robot;
   a plane designation unit to designate a parameter indicating an arbitrary position and an arbitrary orientation of the plane in the three-dimensional space; and
   a change unit to arbitrarily change the position and the orientation of the plane in the three-dimensional space by changing the parameter dynamically,
   wherein the plane designation unit designates the plane by using a tangent plane in contact with a surface of a virtual sphere in the three-dimensional space and by arbitrarily changing a radius of the sphere and a position of a contact point of the tangent plane on the sphere.

18. A computer-readable storage medium for storing a program used to direct a computer to perform operations comprising:
   setting an arbitrary plane, on which a robot makes complex movements to be positioned, in a three-dimensional space, by arbitrarily changing a position and an orientation of the plane in the three-dimensional space according to a parameter value that is changed dynamically; and
   graphically displaying an image of the robot on the set plane for positioning the robot,
   wherein the setting designates the arbitrary plane by using a tangent plane in contact with a surface of a virtual sphere in the three-dimensional space and by arbitrarily changing a radius of the sphere and a position of a contact point of the tangent plane on the sphere.

19. The computer-readable storage medium according to claim 18, further storing a program used to direct a computer to perform operations comprising setting a target position of a specific portion of the robot on the displayed screen.

20. A computer-readable storage medium for storing a program used to direct a computer to perform operations comprising:
   associating a plane, on which a robot makes complex movements to be positioned, in a three-dimensional space with a display plane;
   graphically displaying on the display plane an image of the robot on the plane in the three-dimensional space for positioning the robot;
   setting a parameter indicating an arbitrary position and an arbitrary orientation of the plane in the three-dimensional space; and
   arbitrarily changing the position and the orientation of the plane in the three-dimensional space by amending the parameter dynamically,
   wherein the setting designates the plane by using a tangent plane in contact with a surface of a virtual sphere in the three-dimensional space and by arbitrarily changing a radius of the sphere and a position of a contact point of the tangent plane on the sphere.

21. The interface apparatus of claim 7, wherein the plane designation unit designates the arbitrary plane using a tangent plane in contact with a surface of a virtual sphere in the three-dimensional space.

22. The computer-readable storage medium of claim 8, wherein the setting an arbitrary plane comprises designating the arbitrary plane using a tangent plane in contact with a surface of a virtual sphere in the three-dimensional space.

23. The computer-readable storage medium of claim 10, wherein the associating a plane comprises designating the plane using a tangent plane in contact with a surface of a virtual sphere in the three-dimensional space.

24. The interface apparatus of claim 17, wherein the plane designation unit designates the arbitrary plane using a tangent plane in contact with a surface of a virtual sphere in the three-dimensional space.

25. The computer-readable storage medium of claim 18, wherein the setting an arbitrary plane comprises designating the arbitrary plane using a tangent plane in contact with a surface of a virtual sphere in the three-dimensional space.

26. The computer-readable storage medium of claim 20, wherein the associating a plane comprises designating the plane using a tangent plane in contact with a surface of a virtual sphere in the three-dimensional space.

* * * * *